United States Patent [19]
Yamada et al.

[11] Patent Number: 6,115,537
[45] Date of Patent: Sep. 5, 2000

[54] DIGITAL SIGNAL RECORDING AND REPRODUCING APPARATUS

[75] Inventors: Masazumi Yamada, Moriguchi; Yukio Kurano, Higashiosaka; Kenji Kunitake, Neyagawa; Yuzo Murakami, Osaka; Akira Iketani, Higashiosaka; Chiyoko Matsumi, Suita; Yasuo Hamamoto, Higashiosaka; Akihiro Takeuchi, Ikoma, all of Japan

[73] Assignee: Matsushita Electric Industrial Co., Ltd., Osaka-fu, Japan

[21] Appl. No.: 08/389,954

[22] Filed: Feb. 17, 1995

[30] Foreign Application Priority Data

| Feb. 18, 1994 | [JP] | Japan | 6-021046 |
| Mar. 14, 1994 | [JP] | Japan | 6-042536 |
| Mar. 14, 1994 | [JP] | Japan | 6-042537 |
| Apr. 1, 1994 | [JP] | Japan | 6-064970 |
| Apr. 11, 1994 | [JP] | Japan | 6-071963 |
| May 31, 1994 | [JP] | Japan | 6-118199 |
| May 31, 1994 | [JP] | Japan | 6-118201 |
| Jun. 15, 1994 | [JP] | Japan | 6-132964 |

[51] Int. Cl.$^7$ ............ H04N 5/782; H04N 5/917
[52] U.S. Cl. ............ 386/109; 386/51
[58] Field of Search ............ 386/124, 109, 386/111, 112, 95, 96, 131, 67, 68, 94, 123, 1, 92, 6, 37, 27, 33, 81, 69; 360/32; H04N 5/782, 5/917

[56] References Cited

U.S. PATENT DOCUMENTS

5,377,051  12/1994  Lane et al. ............ 360/33.1

FOREIGN PATENT DOCUMENTS

| 0505985 | 3/1992 | European Pat. Off. . |
| 0627855 | 5/1994 | European Pat. Off. . |
| 0644691 | 9/1994 | European Pat. Off. . |
| 0665689 | 1/1995 | European Pat. Off. . |
| 0629085 | 5/1995 | European Pat. Off. . |

OTHER PUBLICATIONS

"An Experimental Study on a Home–Use Digital VTR", IEEE, 1989,WPM 8.6, International Conference on Consumer Electronics, Jun. 6–9, 1989.

*Primary Examiner*—Robert Chevalier
*Attorney, Agent, or Firm*—Greenblum & Bernstein, P.L.C.

[57] ABSTRACT

In a digital signal recording and reproducing apparatus, digital input data is transmitted in a transmission packet format and is recorded in a recording packet format. In a recording stage, an auxiliary signal generator (3) generates an auxiliary signal for special reproduction in the transmission packet format, and the digital and auxiliary signals are converted into respective recording packets by means of recording signal converters (5, 6). Recording means (9, 10) performs a specific recording process on the recording packets and an identification signal for identifying between the recording packets of the digital signal and of the auxiliary signal. While in a reproducing stage, reproduction signal processing means (14, 15) performs a specific reproduction process on the reproduction signal to thereby reconstruct the recording packets and the identification signal. A packet selector (16) detects the reconstructed identification signal to determine whether the recording packet is of the digital signal or of the auxiliary signal, and then the digital signal or auxiliary signal is reconstructed by a signal reconstructor (17) in the transmission format using the selected recording packet, whereby a high quality image output conforming to the transmission format used in the normal reproductions mode is also obtained during the special reproduction modes.

35 Claims, 31 Drawing Sheets

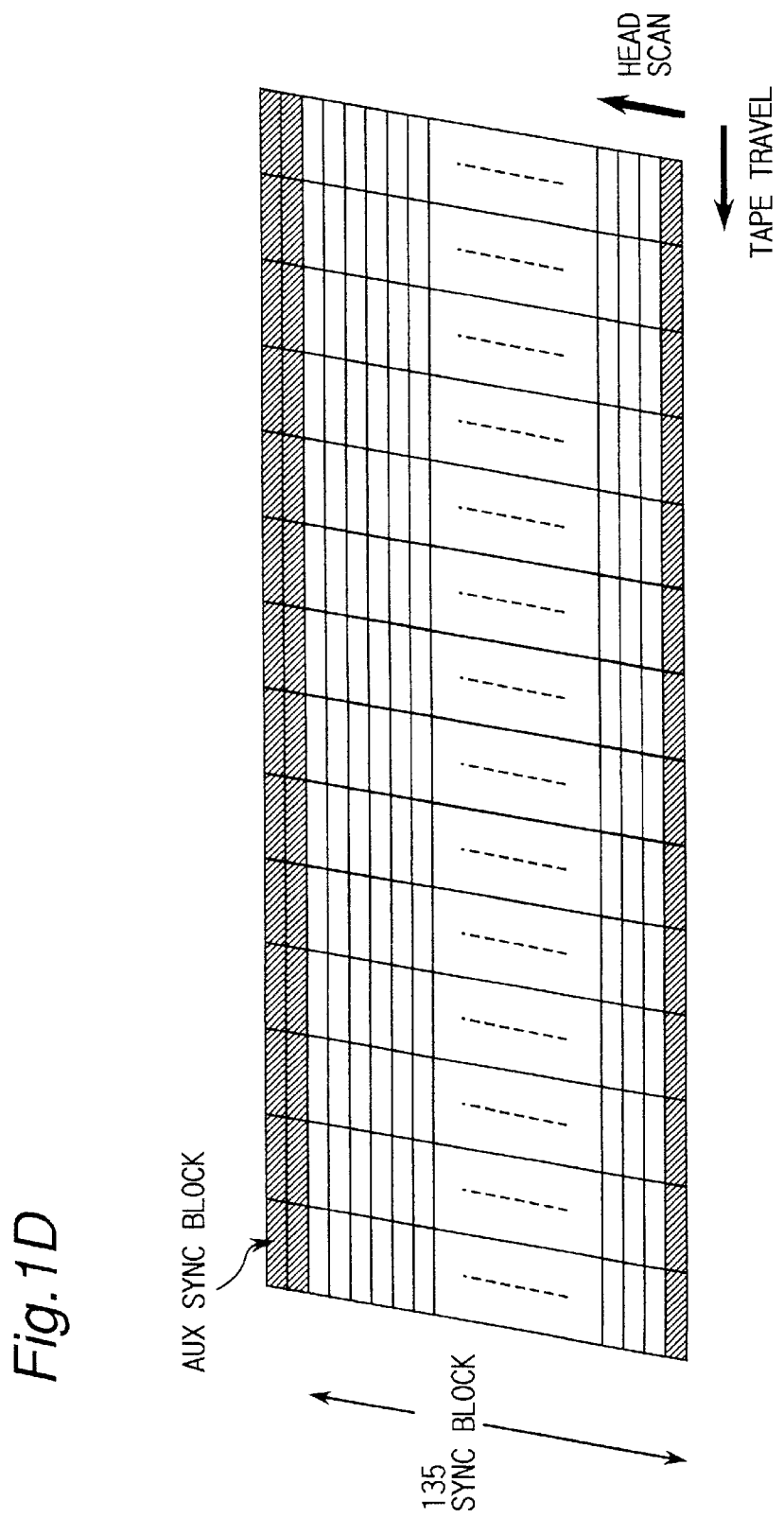

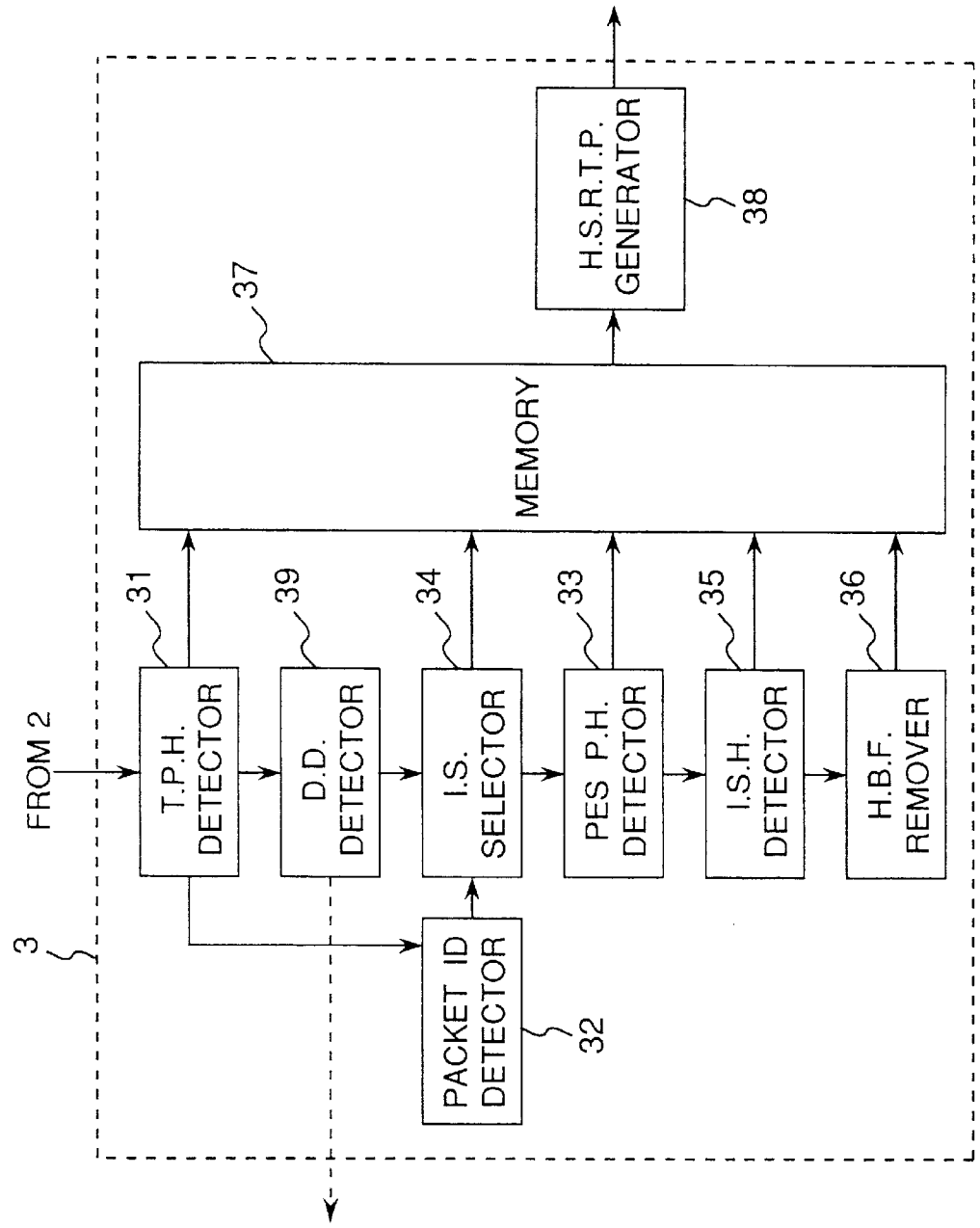

Fig.4E
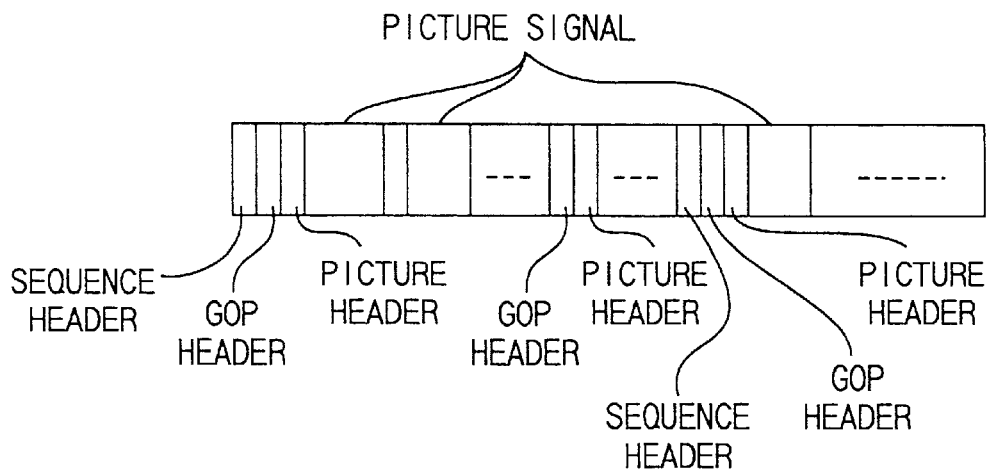
Fig.4F
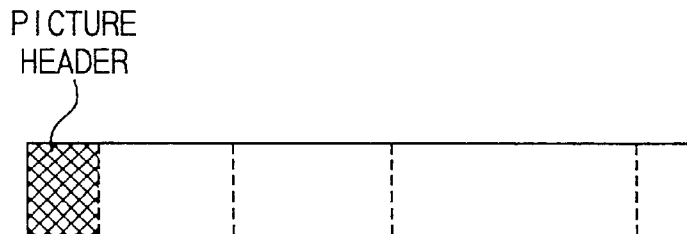
Fig.4G
Fig.4H
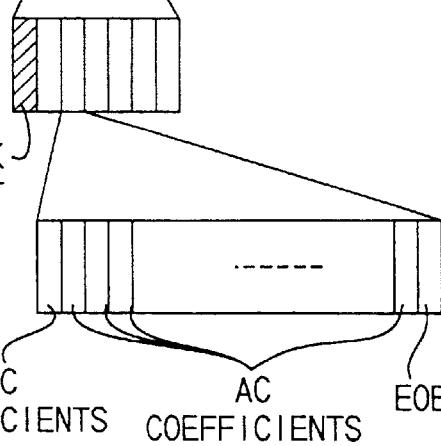
Fig.4I

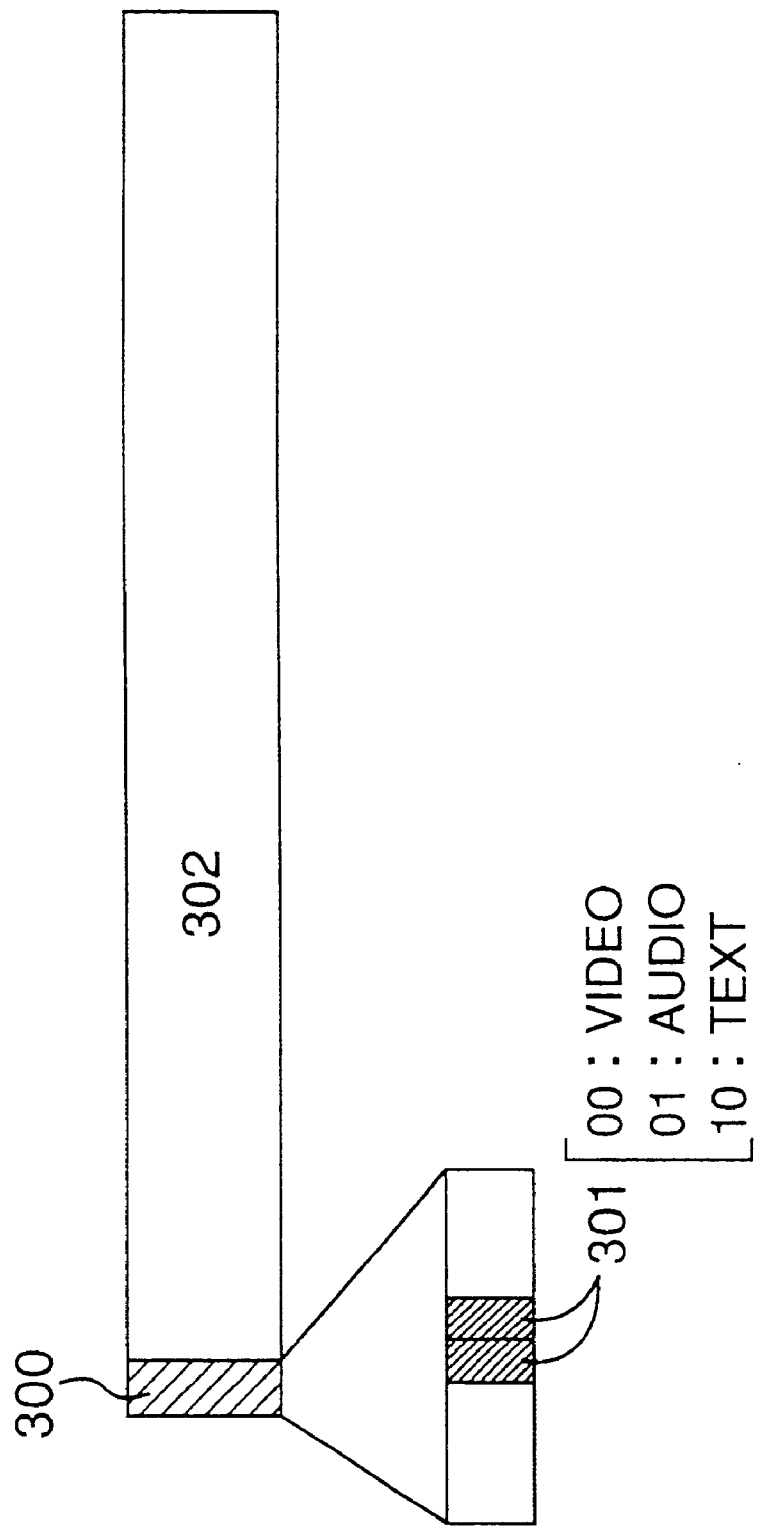

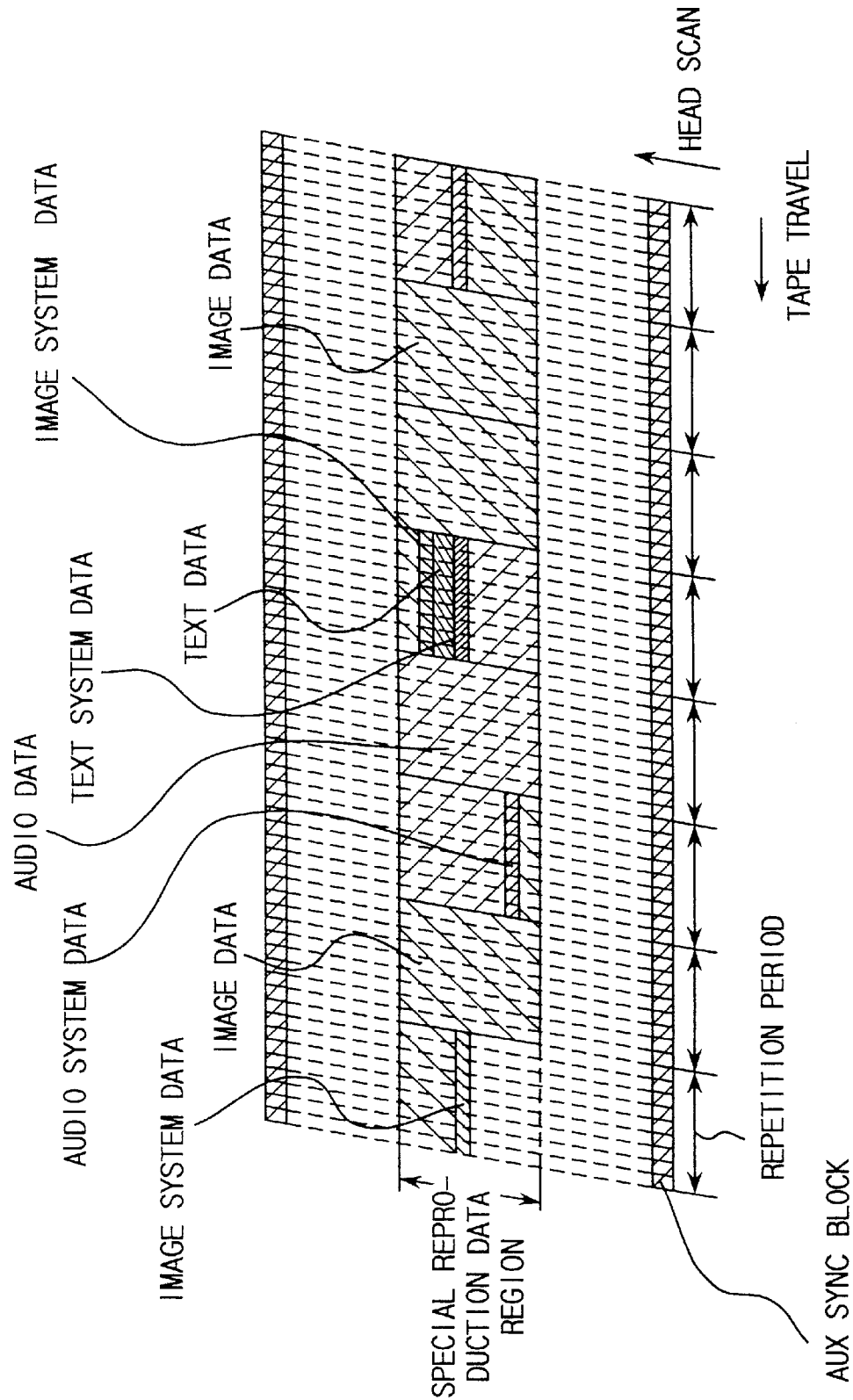

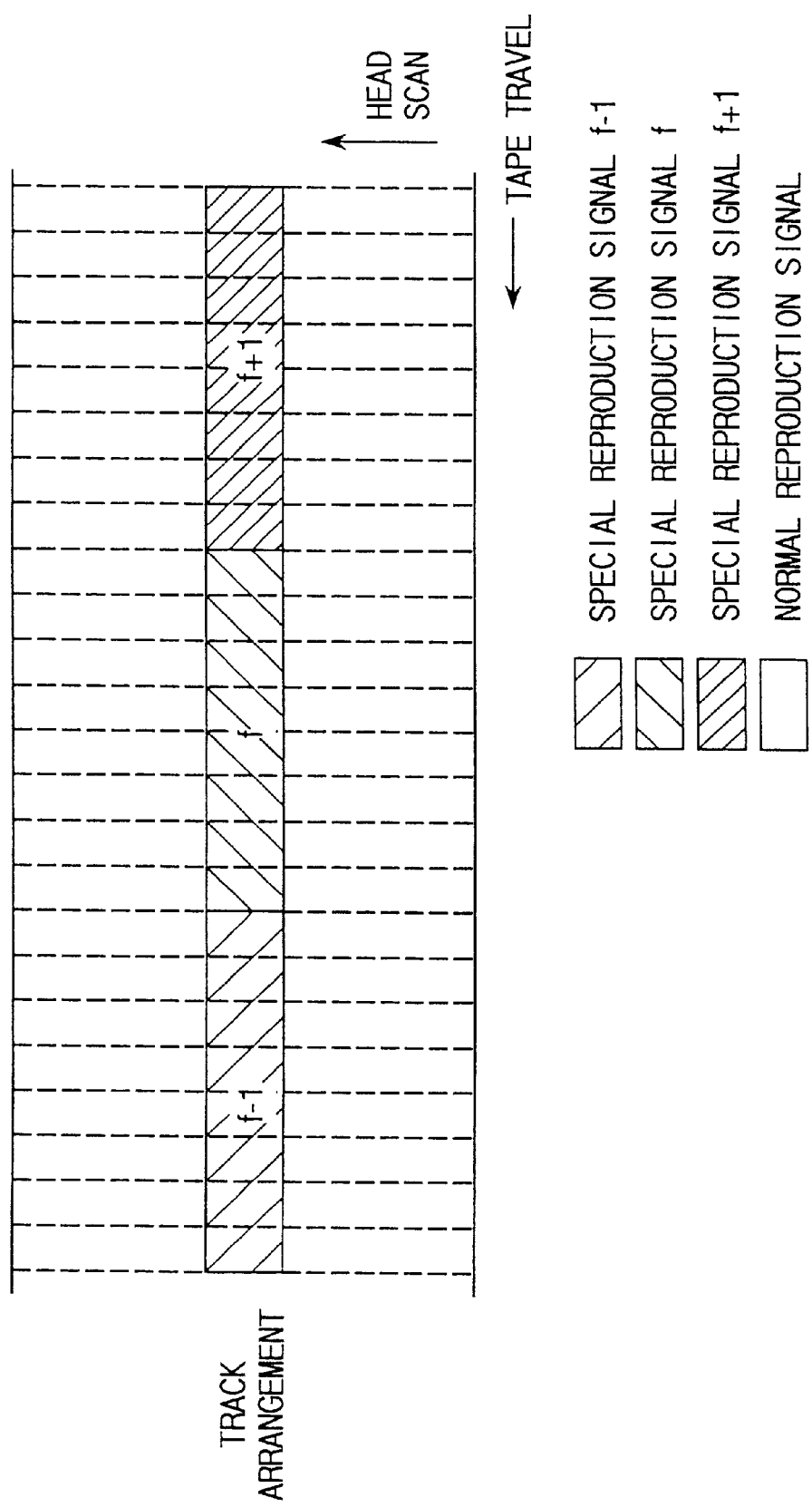

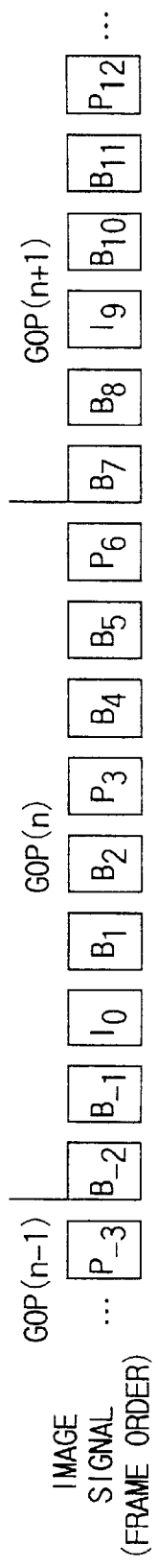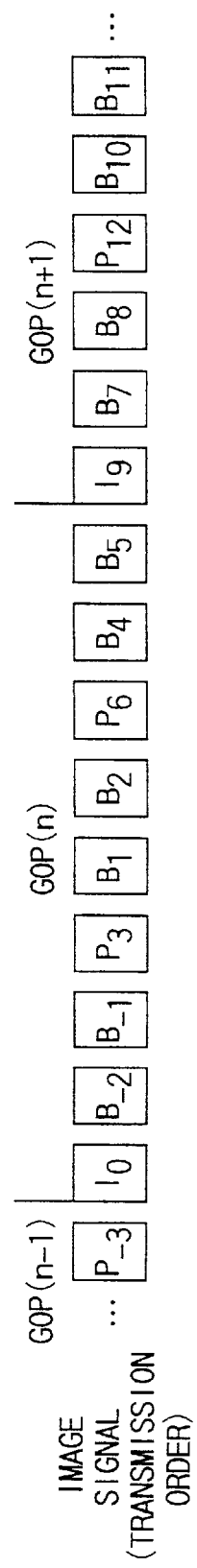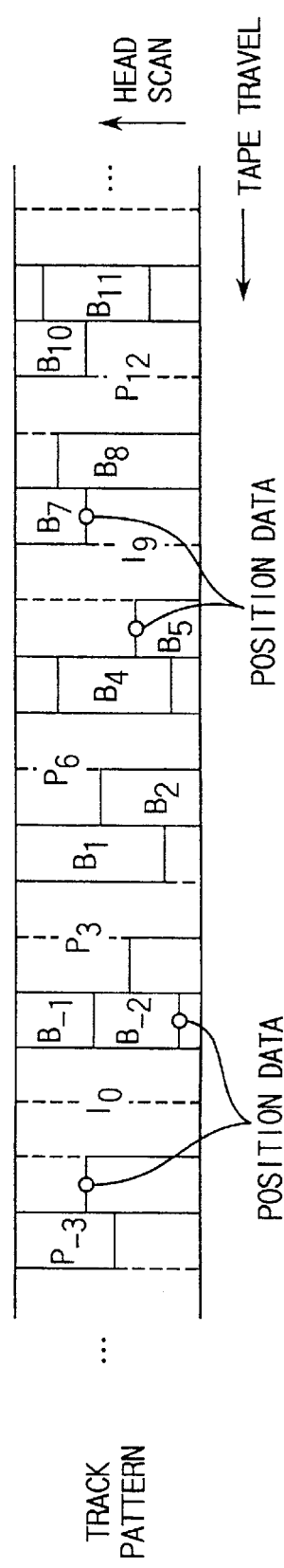

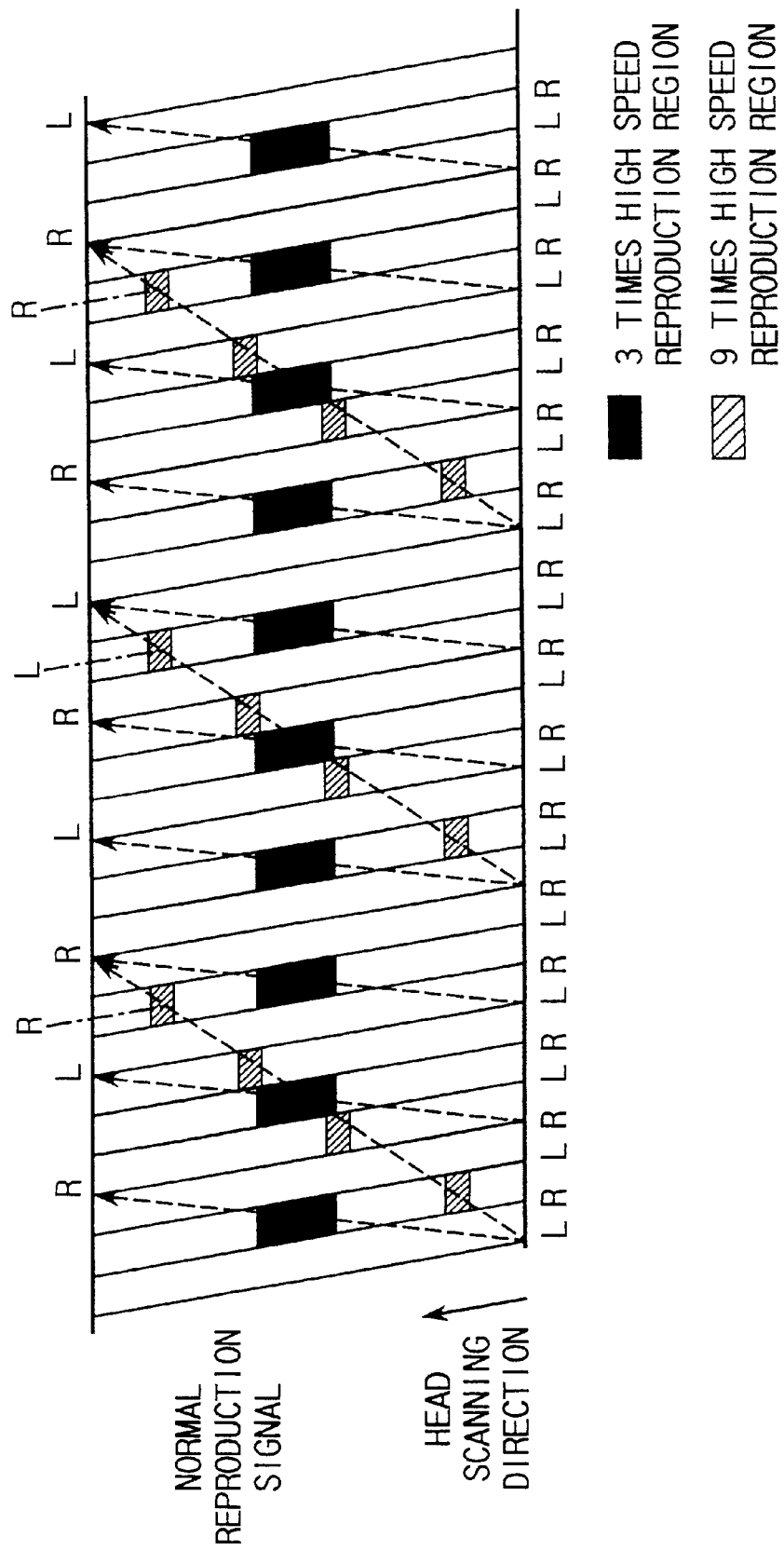

DIGITAL SIGNAL RECORDING AND REPRODUCING APPARATUS

BACKGROUND OF THE INVENTION

1. Field of the Invention

The present invention relates to a digital signal recording apparatus for recording digital signals to a recording medium, and particularly for recording compressed television signals containing an MPEG signal or other video signals compressed by means of a high efficiency compression algorithm, to a digital signal reproducing apparatus for reproducing the digital signals from the recording medium, and to a digital signal recording and reproducing apparatus for recording and reproducing the digital signals.

2. Description of the Prior Art

High efficiency digital coding technologies for video and other images signals have progressed significantly in recent years. Particular attention has been given to inter-frame predictive coding techniques as a means of reducing redundancy on the time-base axis, and international standards for video signal coding techniques have been established. One of these is the ISO-13818 specification, which is commonly known as MPEG-2 for the Motion Picture Expert Group of the ISO.

This method reduces redundancy on the time base by inter-frame predictive coding, and reduces redundancy on the spatial base by discrete cosine transformation (DCT) coding. Predictive error is reduced by motion compensation during inter-frame prediction to improve coding efficiency. The coded data is generally recorded using variable length block units, macro block units, MBS units, picture units, and group-of-picture (GOP) units.

Systems for combining and packetizing the video and audio coded data in an MPEG signal have been established as a means of transmitting such variable length coded data. In this system, the coded data is first converted to variable length packets called a "packetized elementary stream" (PES); these PES packets are then divided into fixed length packets called the "transport stream packets" (TSP). Auxiliary information used, for example, to synchronize the audio and video or to identify multiplexed programs is also written to the TSP.

As described in An experimental study on a home-use digital VCR (IEEE International Conference on Consumer Electronics, Jun. 6–9, 1989; WPM8.6), when recording a base band signal in a digital video cassette recorder (DVCR), the input video signal is compressed, then an error correction signal is added to the compressed video signal for coding the signal for recording, and the coded signal is then recorded on a magnetic tape. During reproduction, the signal read from the magnetic tape is detected and processed for error correction, and then decoded to output the video signal. Note that the video signal is recorded to the magnetic tape in fixed length packet units.

When an MPEG or other compressed television signal is recorded and reproduced, the signal is packetized in units of a fixed number of bits in the transmission sequence of the signal sent from the encoder. During reproduction, the readout packets are reconnected in the sequence read to reproduce the original signal, which is then transmitted to the decoder.

With this conventional method, however, the following problems develop when the input data is data compressed by inter-frame coding as in the case of MPEG signals.

Specifically, during fast forward, fast reverse and other special reproduction modes, a part of the recorded data can be lost, resulting in significant image deterioration, because the heads scan across the recording tracks.

In addition, during special reproduction modes, the data for plural frames is captured to generate the special reproduction frames, and therefore the data for plural frames may be mixed into one special reproduction frame, again resulting in significant image deterioration.

Furthermore, it is not possible to reproduce directly from the recording tracks the auxiliary signals required for the decoder to begin the decoding operation even if it is possible to scan the frame data required for frame decoding during a special reproduction operation. On DVCR without a built-in decoder, it is also necessary to transfer to the decoder the data required for decoding, but the data required for the transfer is also lost.

It is furthermore not possible to output the audio signal or text, symbol, and other character data during a special reproduction operation.

When a tape recorded with a multiplexed signal containing plural channels is to be reproduced in a special reproduction mode, it is also only possible to generate a signal multiplexed with the plural channels mixed.

It is also necessary to add a staff signal for recording rate adjustment to the input signal in order to maintain a constant recording rate during recording of a variable length coded input signal in which the amount of data transferred per unit of time varies. During reproduction, however, it is difficult to separate and reproduce the staff signal and the original input signal.

The conventional apparatus is involved with another problem that undesirable mismatching may occur when errors occur and when overwriting data on a previous recording.

For example, when an error occurs, the error will affect the range at the very least the transport stream packet (TSP) and the packetized elementary stream (PES) packet in which the error occurred. Conventionally, however, it is difficult to determine the TSP divisions in the recording packets and the divisions between the PES packets recorded on the recording medium, and this makes it impossible to restrict the range affected by the error. To determine the locations of the transmission packet divisions, an operation is required for sequentially decoding the bit stream from the header portion. When overwriting previous data, the position from which overwriting begins is irrespective of the divisions between the previously recorded packets, and signal components cannot be decoded and therefore image deterioration-remains on the tape.

Similarly, because it is not possible to determine the hierarchical divisions between, for example, sequences, GOP, and pictures, in the video signal, errors and overwriting result in occurrence of image disruption. In coding methods such as MPEG using inter-frame predictive coding, image deterioration is caused over plural subsequent frames whenever the frame serving as the basis for the predictive coding is disturbed.

Similarly, when plural multiplexed programs are contained in the input signal, it is also difficult to determine the divisions between the programs, and the effects of errors and overwriting affect over the plural programs.

Moreover, there has been a further problem that correct synchronization is not attained when the timing must be synchronized with the input signal. For example, the transmission packets of MPEG2 signal also contain such timing reference signals as a program clock reference (PCR) signal for an external decoder to synchronize the decoding operation with the clock used during the coding operation; a decoding time stamp (DTS) for synchronizing a video signal and audio signal when in decoding operation; and a presentation time stamp (PTS) for synchronizing the decoded video signal and audio signal when the image signal is displayed.

If the tape speed is different between: the recording and the reproducing modes, the transfer timing will differ from the actual timing, and the decoder will not be able to correctly decode and display the signal. For example, if the reproduction speed is three times (3×) the normal speed, the transfer timing of the timing reference signal will also be 3× the normal rate; if the reproduction speed is ½, the transfer timing will also be ½, resulting in that the decoder buffer will either overflow or underflow.

During reverse mode reproduction at, for example, −1× or −3× the normal reproduction rate, the timing reference signal updates reversely to the normal mode reproduction rate and the data is read in reverse order. If the data is then output in the reverse mode reproduction sequence, the decoder is, of course, unable to correctly decode the data.

Furthermore, when the reproduction rate changes during reproduction mode, the reproduced data is not output while the tape speed is being changed. The timing reference data is therefore also not output, and the correct timing reference signal cannot be sent to the decoder.

SUMMARY OF THE INVENTION

Therefore, an object of the present invention is to provide a digital signal recording and reproducing apparatus resolving the problems inherent to the conventional signal recording and reproducing apparatus as described above.

More specifically, an essential object of the present invention is to provide a signal recording and reproducing apparatus in which a high quality image output conforming to the transfer format used in the normal reproduction mode can also be obtained during special reproduction modes while suppressing image deterioration during the special reproduction modes.

A further object is to provide a digital signal recording and reproducing apparatus for minimizing image deterioration resulting from rate mismatching, overwriting, or errors during recording or reproduction modes.

In order to achieve the aforementioned objects, a digital signal recording and reproducing apparatus according to the first embodiment of the present invention comprises a recording system and a reproducing system,
wherein the recording system comprises:
an auxiliary signal generating means for generating an auxiliary signal in a predetermined transmission packet format based on receipt of a digital input signal transmitted in the predetermined transmission packet format;
a recording signal conversion means for converting the digital signal and/or auxiliary signal to a predetermined recording packet format; and
a recording means for applying a specific recording signal process to the recording packet and an identification signal for distinctly identifying the digital signal from the auxiliary signal, and recording the processed signals on a recording medium,
and wherein the reproducing system comprises:
a reproduction signal processing means for obtaining the reproduction signal from the recording medium and applying a specific reproduction signal process to reconstruct the recording packet and identification signal;
an evaluation means for detecting the reconstructed identification signal to determine whether the recording packet is a recording packet comprising the digital signal or is a recording packet comprising the auxiliary signal; and
a signal reconstruction means for reconstructing the digital signal or auxiliary signal in the transmission packet format using the recording packet comprising a digital signal or auxiliary signal, respectively.

By generating an auxiliary signal related specifically to the input video signal based on the receipt input video signal separately from the normal reproduction signal used during normal reproduction operations, and simultaneously recording an identification signal into the recording packet recorded on the magnetic tape for identifying whether the signal recorded to that packet is a normal reproduction signal or an identification signal, a digital signal recording and reproducing apparatus according to this embodiment provides improved image quality because it is able to correctly decode and output the reproduction signal even during special reproduction modes by reading the identification signal recorded in the recording packet during the reproduction operation.

In this first embodiment, video header signal data identifying the number of pixels and the aspect ratio and the like required for output image generation, and packet header information required in a transmission packet format or PES packet format, can be recorded with the special reproduction data or the normal reproduction data to each recording packet. As a result, it is possible to reproduce the image data for high speed reproduction and normal reproduction by simply identifying between special reproduction data and normal reproduction data packets during reproduction operation. This also simplifies the control operation during reproduction, and simplifies the configuration of the apparatus.

In addition, by also recording the packet header signal previously in the order to be transmitted into the recording packets which the header information is required when forming the PES packets and the TSP, the packetizing operation at the output process is made easier. As a result, the special reproduction signal can be output with the same image format used commonly for normal reproduction, and high image quality can be obtained during the special reproduction modes.

In a digital signal recording and reproducing apparatus according to the second embodiment of the present invention, the apparatus receives a digital input signal transmitted in a predetermined transmission packet format, and the auxiliary signal generating means generates an auxiliary signal required during special reproduction modes and header data common to special reproduction modes based on the digital input signal, and the auxiliary signal reconstruction means adds said header data to the auxiliary signal to reconstruct the transmission packet format.

With this configuration of this embodiment, it is possible to separately record a packet header signal common to each of the transmission packets during recording modes. As a result, the transmission packets can be easily reconstructed during the special reproduction modes.

Moreover, the data common to a plurality of transmission packets is represented by the common packet header signal to be recorded, and therefore the amount of the auxiliary signal to be recorded on the recording medium can be reduced.

It is specifically easier to collect the auxiliary frame data for any single frame during special reproduction modes by recording a video header signal common to each of the auxiliary frames between the auxiliary frame data for the individual auxiliary frames during recording modes. Even more specifically, reliable decoding during reproduction is made possible because the common video signal needed for decoding is always disposed before the data corresponding to one frame. Even during reverse mode reproduction, it is possible to collect the auxiliary frame data for one complete frame, the common video header signal can be read before the data for the one frame even during reverse mode reproduction, and the data for one frame can be easily rearranged in reverse order while reliable decoding is made possible.

In a digital signal recording and reproducing apparatus according to another embodiment of the present invention, the recording system thereof comprises:

an auxiliary signal generating means for generating an auxiliary signal based on the digital signal, and auxiliary signal generation data which indicates auxiliary signal generation when an auxiliary signal is to be generated based on the digital signal, and for generating auxiliary signal generation data which indicates that the auxiliary signal was not generated when an auxiliary signal is not to be generated based on the digital signal;

a recording signal conversion means for converting the digital signal and, the auxiliary signal when the auxiliary signal is generated, to recording packets; and a recording means for applying a specific recording signal process to the auxiliary signal generation data and the recording packets, and recording the processed recording signal onto a recording medium, and the reproducing system thereof comprises:

a reproduction signal processing means for obtaining the reproduction signal from the recording medium and applying a specific reproduction signal process to reconstruct the recording packet and auxiliary signal generation data; and a signal reconstruction means for reconstructing and outputting the digital signal or auxiliary signal using the recording packet comprising the digital signal or auxiliary signal when the reconstructed auxiliary signal generation data indicates generation of the auxiliary signal data, and reconstructing and outputting the digital signal using the recording packet comprising the digital signal when the reconstructed auxiliary signal generation data does not indicate generation of said auxiliary data.

According to the feature of this embodiment, the data indicating whether a special reproduction packet has been recorded is also recorded onto the recording medium. Therefore, it is possible to output an error message or take other appropriate action when the special reproduction packet is not recorded and the special reproduction mode is selected for reproduction.

In particular, when an interference signal is superimposed to the input signal and special reproduction can not be executed, special reproduction can be disabled and meaningless special reproduction can be eliminated by detecting in the input signal a copy information signal for evaluating whether the input, signal can be decoded, or by detecting in the input signal an interference information signal for evaluating whether the input signal can be decoded.

BRIEF DESCRIPTION OF THE DRAWINGS

The present invention will become more fully understood from the detailed description given below and the accompanying diagrams wherein:

FIG. 1D is an explanatory view of a track pattern and recording packet location on a magnetic tape according to the present invention;

FIG. 4A is a block diagram of an auxiliary signal generator of the first embodiment;

FIG. 4E is a view showing an example of a header arrangement of MPEG video signal;

FIGS. 4F, 4G, 4H, and 4I are views showing an example of data arrangement below a picture signal of MPEG video signal;

FIG. 5D is a view for explaining the second identification way of an auxiliary signal of the second embodiment;

FIG. 5F is a view for explaining the fourth identification way of an auxiliary signal of the second embodiment;

FIGS. 6E and 6F are views for explaining the second way of packet conversion of the present invention;

FIG. 7A is an explanatory view of a frame division flag of the present invention;

FIGS. 7E, 7C and 7D are explanatory views of a second example of a frame division flag of the present invention;

FIG. 8E is a view of a track pattern for explaining a third example of an operation of a system controller of the present invention;

DESCRIPTION OF PREFERRED EMBODIMENTS

Figure 1A:
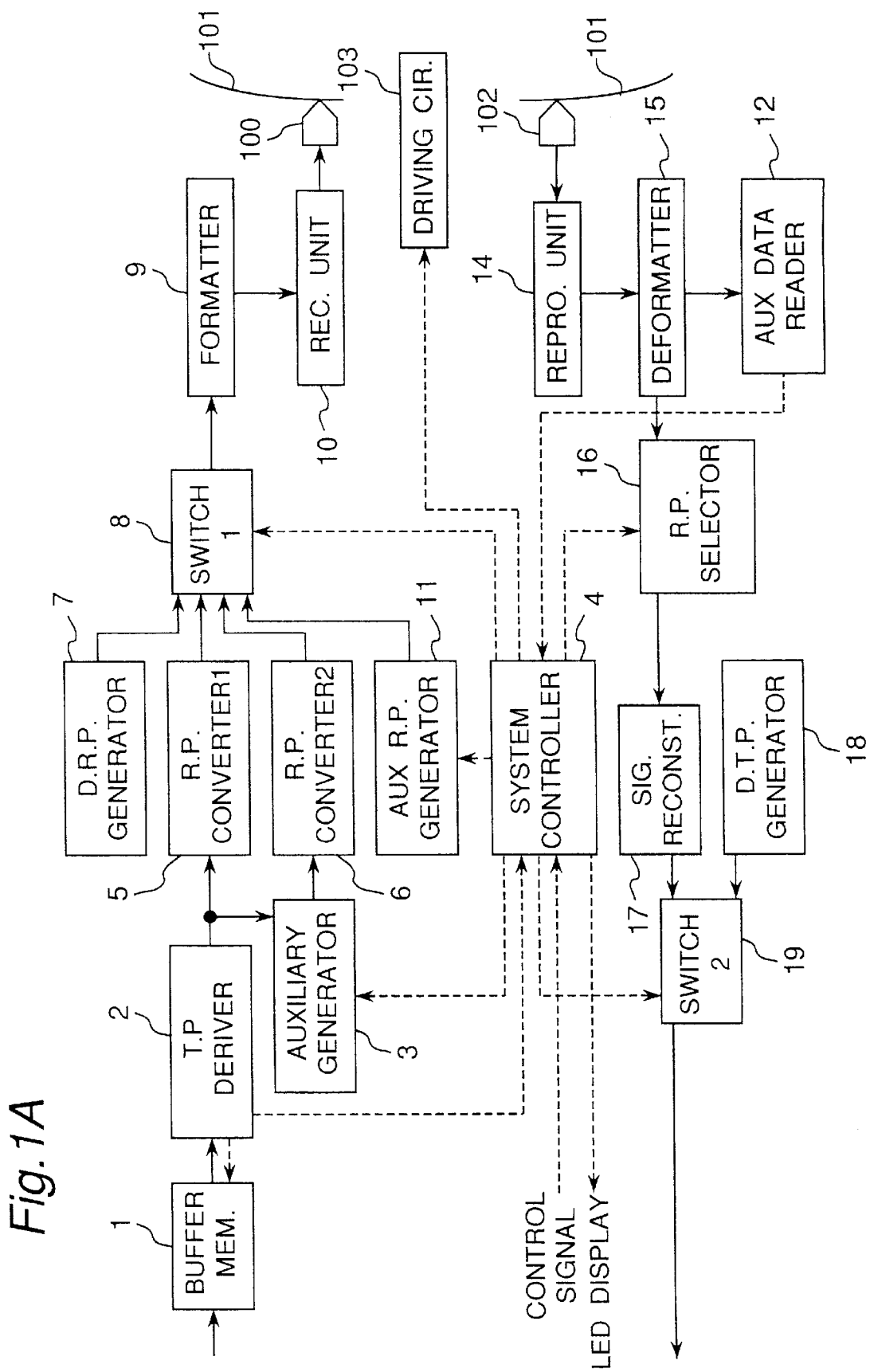
FIG. 1A is a block diagram of a digital signal recording and reproducing apparatus according to the first embodiment of the present invention.

The following describes preferred embodiments of the present invention with reference to the drawings. Before the description proceeds, it is to be noted that like parts are designated by the same reference numerals throughout the drawings.

The following describes a construction and operation of a digital signal recording and reproducing apparatus of a first embodiment in the case where the apparatus receives compressed television signals as its input signals to be transmitted in a predetermined transmission packet format (i.e., fixed-length of 188 bytes) containing image signals such as MPEG signal and the apparatus records the input television signals on a recording medium such as a magnetic recording tape, which the input television signals are compressed by a method of inter-frame predictive coding techniques.

By this operation, variable length packets called PES packets are generated based on a predetermined number of transport packets.

Embodiment 1

FIG. 1A shows a block diagram of a digital signal recording and reproducing apparatus according to the first embodiment of the present invention.

As shown in FIG. 1A, the digital signal recording and reproducing apparatus comprises a buffer memory 1, a transmission packet (TP) deriver 2, an auxiliary signal generator 3, system controller 4, first and second recording packet (RP) converters 5 and 6, dummy recording packet (PRP) generator 7, first switching selector 8, formatter 9, recording unit 10, AUX recording packet generator 11, magnetic recording head 100, magnetic tape 101, magnetic reproducing head 102, driving circuit 103, reproduction unit 14, AUX data reader 12, deformatter 15, recording packet (RP) selector 16, signal reconstructor 17, dummy transmission packet (DTP) generator 18, and second switching selector 19.

Figure 1B:
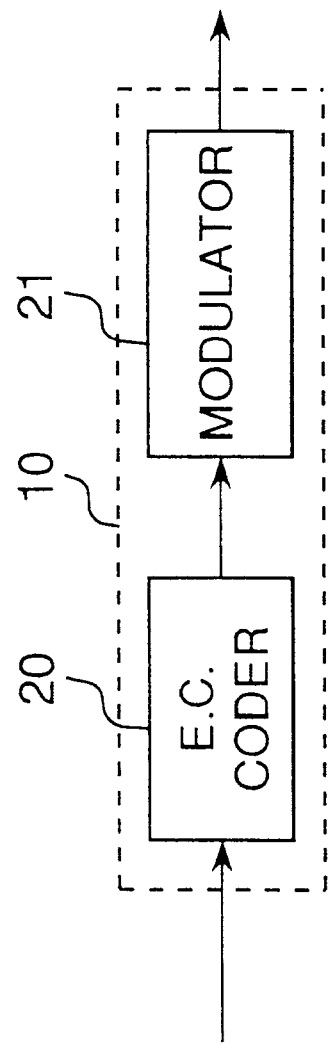
FIGS. 1B and 1C are block diagrams of a recording circuit and reproduction circuit, respectively, of the present invention.
Figure 1C:
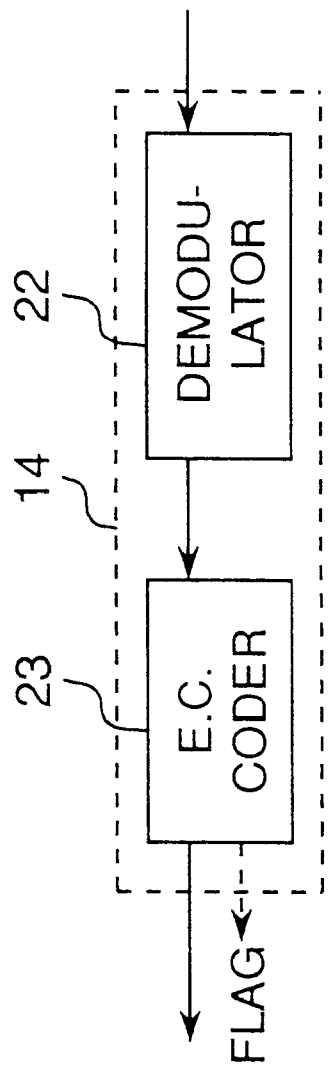

As shown in FIG. 1B, the recording circuit 10 comprises an error correction (EC) coder 20 and modulator 21 while the reproduction circuit 14, as shown in FIG. 1C, comprises a demodulator 22 and error correction (EC) decoder 23.

In the apparatus, the input digital signal is applied to the transmission packet deriver 2 through the buffer memory 1. The system controller 4 is fed with an external control-signal so as to identify whether or not the applied digital signal is of an MPEG transmission packet format. Alternatively, by means of the transmission packet deriver 2, the transmission packet format of the digital signal is identified by comparing the information of the transmission packet format of the digital signal with that of the transmission packet format previously provided in the apparatus.

When the transmission packet format of the input signal is identified to be acceptable for the apparatus, the subsequent recording processes are executed.

Whereas, in the case of having an unacceptable format for the apparatus, the content indicating that the input signal is not acceptable for the apparatus is displayed on a display panel and the recording operation is stopped.

The digital signal as well as a transmission pulse indicating the header of the detected transmission packet is outputted from the transmission packet deriver 2 at each transmission packet.

The auxiliary signal generator 3 generates an auxiliary signal in a transmission packet format with use of a partial or entire part of the digital signal applied from the transmission packet deriver 2.

As an auxiliary signal, there is used, for example, a special reproduction signal for extracting an intra-frame coded frame signal among the image signals contained in the digital signals and generating the extracted signal in the special reproduction mode.

In this embodiment, there is used a normal reproduction signal for use in the normal reproduction mode as an input image signal.

The construction of the auxiliary signal generator 3 is to be described later.

It is to be noted here that, when an auxiliary data can not be generated due to interference data such as scrambles, the content indicating impossibility of generation of the auxiliary data is transmitted to the system-controller 4 and then the subsequent process for generating auxiliary data is not effected.

The digital signal is fed from the transmission packet deriver 2 to the first recording packet converter 5 while the special reproduction signal is fed from the auxiliary signal generator 3 to the second recording packet converter 6, where the respective transmission packets are converted to a recording packet format called as a sync block having a fixed-length of 77 bytes which is a recording unit on the tape track as shown in FIG. 1D.

The construction of the recording packet converter is to be described later.

The header of 1 byte of the sync block is used as header information which indicates data of packets and which the header information is added to each sync block.

One bit of the sync block header is used as a flag for switching between the normal reproduction data and the special reproduction data, where a flag "0" is written in the first recording packet converter 5 for converting normal reproduction data and a flag "1" is written in the second recording packet converter 6 for converting special reproduction data.

By means of the dummy recording packet generator 7, a dummy data sync block is generated based on the data rate of the input digital signal and the recording data rate of the recording system for compensating the difference therebetween. A flag for identifying whether or not the data is the dummy recording packet is recorded id each sync block header.

For example, assuming that the flag for switching between the normal reproduction data and the special reproduction data of the dummy data sync block is set "0" as the dummy recording packet evaluation flag with use of the second bit of the header of the sync block comprised of the normal reproduction data, when the dummy recording packet evaluation is flag is "1", the data is evaluated as the dummy data.

In a digital VCR, as an auxiliary data other than the input data, an AUX region is provided as a special region for recording the date of recording and the like as shown in FIG. 1D. The AUX recording packet generator 11 generates a predetermined AUX sync block format, which the construction thereof is similar to that of the conventional digital VCR.

The information fed to the system controller 4 as to whether the transmission packet is detected, information as to the transmission packet format, and information as to special reproduction information are sent to the AUX recording packet generator 11 and added in a predetermined AUX region sync block format in a similar manner to that of the other information.

The system controller 4 controls the first switching selector 8 so that the sync block composed of a special reproduction signal is arranged in a predetermined pattern order on the magnetic tape.

The first switching selector 8 receives a sync block composed of normal reproduction signals transmitted from the first recording packet converter 5, a sync block composed of special reproduction signals transmitted from the second recording packet converter 6, and dummy data sync block transmitted from the dummy recording packet generator 7, where the received sync blocks are adjusted in arrangement based on the control signal transmitted from the system controller 4 so that the applied sync blocks are arranged in a predetermined pattern order on the track, and then the order-patterned sync blocks are fed to the formatter 9. It is to be noted here that the recording pattern order of the AUX sync block is adjusted in a predetermined pattern similar to that of the conventional apparatus.

In the formatter 9, ID information indicating a track position on the magnetic tape 101 of each sync block and indicating the sync block position on the track is added to each sync block.

The output of the formatter 9 is fed to the recording unit 10 where the data having the ID information added is further provided with an error correction code added by means of the error correction coder 20, and then subjected to modulation by means of the modulator 21. The resultant recording signal generated by the recording unit 10 is recorded on the magnetic tape 101 by means of the recording head 100.

Since the construction of the recording unit 10 is similar to that of the conventional digital VCR except for the error correction code varying in response to the input signal, therefore the detail explanation thereof is omitted here.

Next, the following describes a reproduction operation of the apparatus.

Initially, the normal reproduction mode or special reproduction mode of any optional times high speed is selected and then the control signal corresponding to the selected special reproduction mode is transmitted from the system controller 4 to the driving circuit 103 so that the driving circuit 103 drives the magnetic tape 101 at a travelling rate corresponding to the selected mode.

In the reproduction circuit 14, the data signal read out by the reproduction head 102 from the magnetic tape 101 is demodulated by means of the demodulator 22 and the demodulated signal is subjected to an error correction process according to the added error correction code, and then the processed signal is outputted to the deformatter 15. As a result of the error correction process in the reproduction circuit, when there is a sync block to which error correction can not be effected, the error correction decoder 23 generates an error evaluation pulse together with the sync block.

Since the construction of the reproduction unit 14 is similar to that of the conventional digital VCR except for the error correction code varying in response to the input signal, therefore the detail explanation thereof is omitted here.

The deformatter 15 extracts the ID information of the sync block added in the formatter 9 and rearranges each of the reproduced sync blocks based on the ID information in the same order pattern as that of the sync blocks recorded on the magnetic tape. The memory necessary for formatting and deformatting may be commonly used as a memory for error correction.

In the deformatter 15, the AUX sync block of the recording packets generated by the AUX recording packet generator 11 is distinctly detected based on the ID and fed to the AUX information reader 12. The AUX information reader 12 transmits the information recorded in the AUX sync block to the system controller 4

The recording packet selector 16 derives an identification flag from the sync block header for identifying the signal recorded in the sync block header. Then the recording packet selector 16 receives the reproduction mode data from the system controller 4 which the reproduction mode data indicates as to whether the operation is in the normal reproduction mode or in the special reproduction mode together with indication of the times of the reproduction rate.

In the normal reproduction mode, selected is a sync block recording the normal reproduction signal based on the identification flag and is then transmitted from the recording packet selector 16 to the signal reconstructor 17.

Similarly, in the special reproduction mode, selected is a sync block signal which records the special reproduction signal based on the identification flag and is then transmitted to the signal reconstructor 17.

According to the information contained in the AUX sync block obtained by the AUX information reader 12, when it is turned out that no special reproduction signal is generated at the time of recording, since the system controller 4 has no data in the special reproduction mode, the image picture can not be generated, which the content is displayed on the display panel.

In the signal reconstructor 17, the header and the like is removed from the input sync block so as to be returned to the data arrangement pattern of the transmission packet to be generated.

The construction of the signal reconstructor 17 is described later.

In the case where the sync block under current reconstruction processing is one which can not be error-corrected judging from the error evaluation pulse generated by the error correction decoder 23, an error-indicator-flag located on the header of the transport packet reconstructed from each sync block is written. Thus, the fact that there is an error on the transport packet can be informed to an external decoder.

The dummy transmission packet generator 18 generates a dummy transmission packet in a transmission packet format, having no meaning for the external decoder. The outputs of the signal reconstructor 17 and dummy transmission packet generator 18 are both fed to the second switching selector 19 where the reconstructed transmission packet and the dummy transmission packet are selectively switched therebetween to adjust the reproduction rate to be outputted.

With the above described construction, the special reproduction signal to be outputted in frame in the special reproduction mode is generated from the input image signal irrespective of the normal reproduction signal, and further when recording data in the sync block on the magnetic tape, also an identification flag for identifying whether the signal contained in the packet is normal reproduction signal or special reproduction signal is simultaneously recorded on the sync block header, whereby the identification flag recorded on the sync block header is read in the reproduction mode, and also in the special reproduction mode the reproduction signal can be correctly decoded to be output, and therefore the image quality of the output displayed picture can be improved.

In addition, since the special reproduction data is generated in the transmission packet format same as that of the normal reproduction data, therefore the subsequent recording and reproduction processes can be made in common use, simplifying the construction of the apparatus.

Moreover, since the information as to whether the special reproduction packet is recorded in the recording mode is recorded on the recording medium, even when the special reproduction mode is selected under the condition of recording no special reproduction packet, it is possible to cope with the disadvantage by generating an error message or the like in the reproduction mode.

TRANSMISSION PACKET DRIVER

Figure 3:
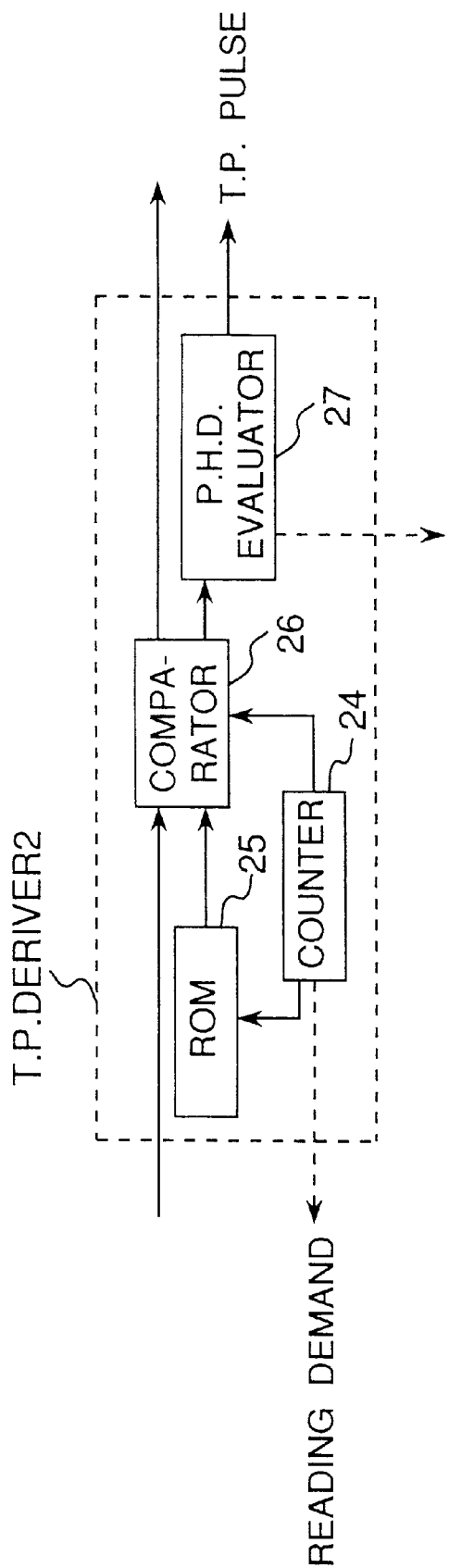
FIG. 3 is a block diagram of a transmission packet deriver of the present invention.

FIG. 3 shows a construction of the transmission packet (TP) deriver 2.

In the transmission packet deriver 2, the transmission packet (TP) format of the digital signal is identified by comparing the data of the transmission packet of the digital signal with the data of the transmission packet previously provided in the apparatus.

As shown in FIG. 3, the transmission packet deriver 2 comprises a counter 24, ROM 25, comparator 26 and packet header detection (PHD) evaluator 27, where the ROM 25 stores a header bit line of the transmission packet, for example, 1 byte of "0x47" is recorded in ROM 25 in the case of MPEG transmission packet.

The counter 24 sends reading demands in sequence to the buffer memory 1 and ROM 25 previously storing the header bit line, while sequentially feeding the bit line to the comparator 26. The comparator 26 compares the bit line fed from the buffer memory 1 and the bit line fed from ROM 25 is while shifting the addresses in sequence. When there is a bit line coincident with each other as a result of the comparison, a pulse indicating the time point at that time is transmitted to the packet header detection evaluator 27.

Under a predetermined condition, the packet header detection evaluator 27 judges that detection of the transmission packet header is established, and then informs the system controller 4 of the fact that the input signal can be received in a transmission packet format, where the predetermined condition is considered such as a case that the counts of the counter is three times or more, i.e., in this example, a coincident pulse is entered at an interval of 188×8 bits. When the comparison is effected on a plurality of packet formats, the packet header detection evaluator informs the system controller 4 of which transmission packet format is acceptable.

The transmission packet deriver 2 generates a transmission packet pulse indicating the header of the detected transmission packet together with the digital signal at each transmission packet.

Information fed to the system controller 4 as to whether the transmission packet is detected and information as to the transmission packet format are both transmitted to the AUX recording packet generator 11 where the both information are added to form sync blocks of the recording packets in a predetermined AUX region sync block format in a manner similar to that of the other information.

AUXILIARY SIGNAL GENERATOR

FIG. 4A shows a construction of the auxiliary signal generator 3 which comprises a transmission packet header (TPH) detector 31, packet ID detector 32, PES packet header (PH) detector 33, image signal (IS) selector 34, image signal header (ISH) detector 35, high band factor (HRBF) remover 36, memory 37, high speed reproduction transmission packet (HSRTP) generator 38, and decoding data (DD) detector 39.

The digital signal inputted to the auxiliary signal generator 3 is fed to the transmission packet header detector 31. The transmission packet header detector 31 confirms the position of the header information of the transport packet contained in the input signal based on the transmission packet pulse applied together with the input signal, and the confirmed header position of the header information is outputted to the packet ID detector 32.

The decoding information detector 39 detects an interference information signal affecting against the input signal contained in the transport packet header information and generates a generation flag indicating whether or not a special reproduction signal can be generated due to the interference information signal.

In the packet ID detector 32, the ID information is detected for identifying each transport packet, and thereafter each transport packet together with the ID information is fed to the image signal selector 34.

The image signal selector 34 identifies whether or not the input transport packet fed from the packet ID detector 32 is a packet containing an image signal or other signal such as an audio signal. When the signal contained in the packet is related to an image signal, the header of the transport packet is extracted and fed to the memory 37, and thereafter the transport packet data with its header data removed therefrom is fed to the PES packet header detector 33 from the image signal selector 34.

The transport packet header contains a flag called as "payload-unit-start-indicator" indicating a dividing position of the PES packet which indicates that a new PES packet starts from the outstanding transport packet. When the flag "payload-unit-start-indicator" indicates a division of the PES packet, the presence of the PES packet division is informed by transmitting the PES packet pulse to the packet header detector 33.

In the PES packet header detector 33, the position of the PES packet header is identified based on the PES packet pulse and the PES packet header is derived and fed to the memory 37 in a similar manner to that of the transport packet is header. Then the PES packet with its header removed therefrom is fed to the Image signal header detector 35.

Figure 4B:
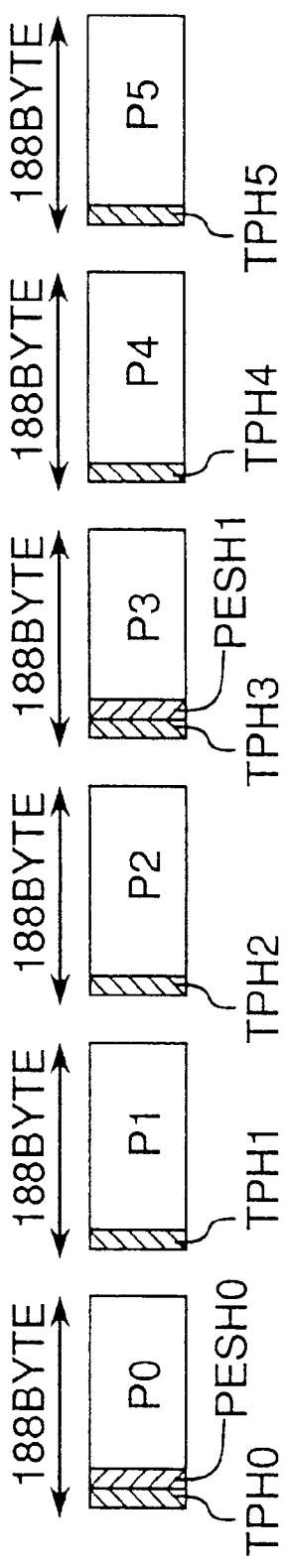
FIGS. 4B and 4C are explanatory views each showing relation of a transmission packet and PES packet in MPEG signal.
Figure 4C:
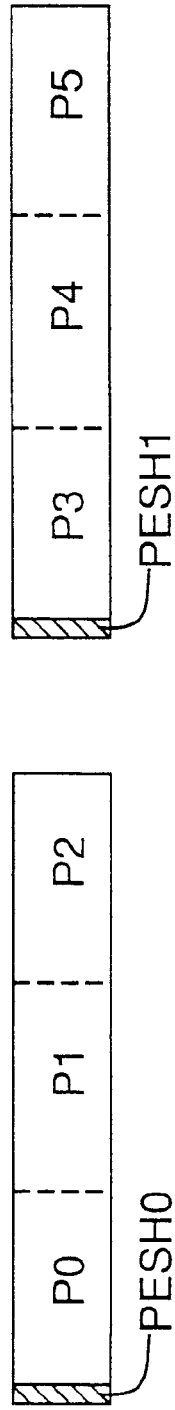

FIGS. 4B and 4C show a transport packet and PES packet, respectively.

The transport packet header detector 31, as shown in FIG. 4B, detects the positions of the header data in the transport packet, namely, the header positions of the transport packet headers TPR0, TPH1, TPH2 and TPH3 and then transmits the header information to the high speed reproduction transmission packet converter 38. Signals P0, P1, P2, and P3 other than the header information contained in the transport packet are fed to the PES packet header detector 33.

In the PES packet header detector 33, the PES packet is formed with a PES packet header PESH0 as shown in FIG. 4C.

In the image signal header detector 35, the header information at each classified stage in the image signal is fed to the memory 37 while the remainder signals are fed to the high band factor remover 36. The high band factor remover 36 extracts, a code of a factor of DC components in each block, a partial code in a low band of the AC factor (AC components) and EOB (End Of Block) added to each block end among the image signal and then the extracted codes are fed to the memory 37.

The following describes the operation of the image signal header detector 35 with reference to FIGS. 4D to 4I.

Figure 4D:
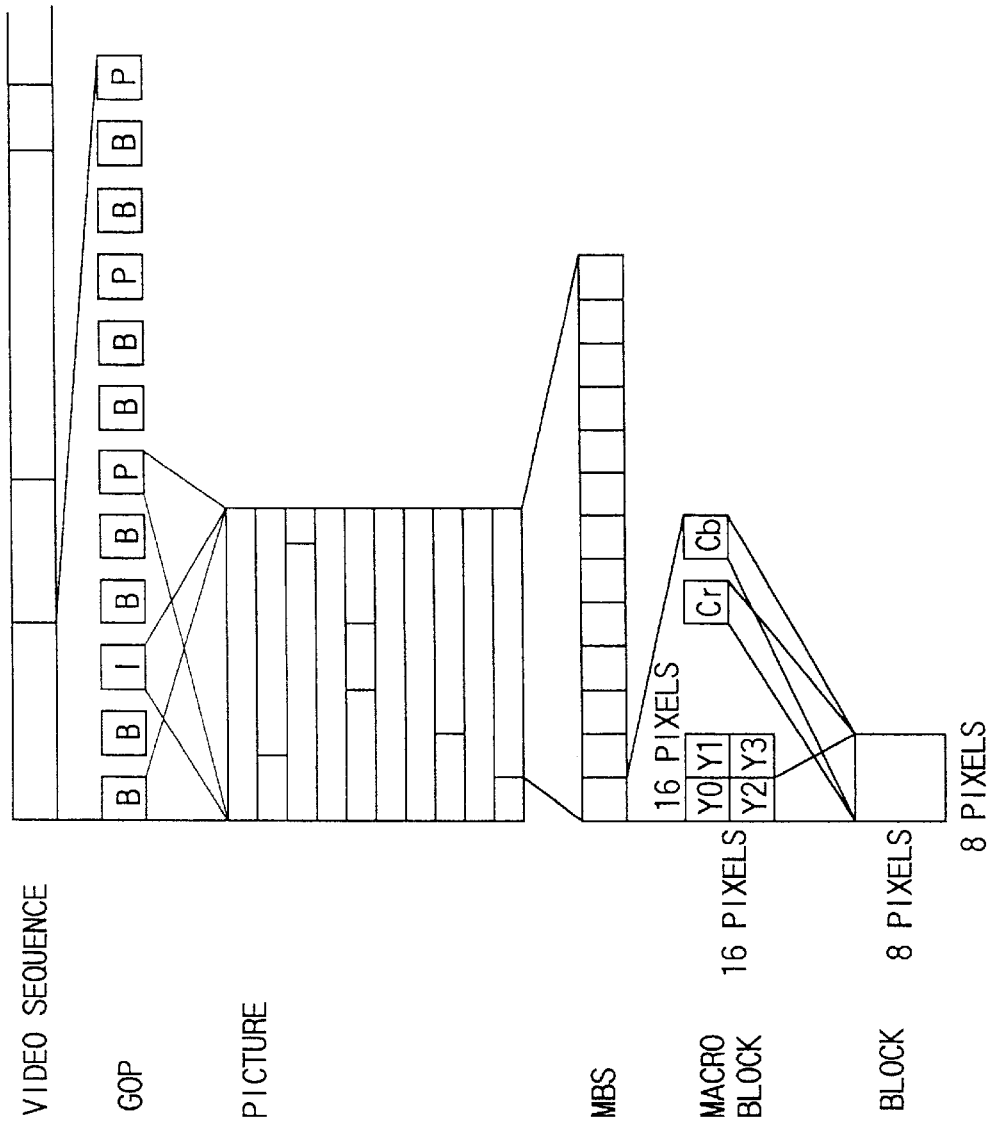
FIG. 4D is an explanatory view of a classified construction of MPEG video signal.

The image signal fed to the image signal header detector 35 is constructed as shown in FIG. 4D, where the compressed video data bit stream includes an I-picture (intra frame), B-picture (bidirectional interpolated frame) and P-picture (predictive frame), which are produced in a pattern I,B,B,P,B,B, repeatedly. The frames in the pattern I,B,B,P,B,B are called a group of pictures (GOP). The I-picture includes one complete data for one frame and can reproduce one frame picture by itself. The B-picture includes data for one frame, but can not reproduce one frame picture by itself. Similarly, the P-picture includes data for one frame, but can not reproduce one frame picture by itself. Thus, the I-picture can be considered as an independent frame that can reproduce by itself, and B-picture and P-picture can be considered as a dependent frame that requires to make reference of other frame.

Video sequence, GOP and picture data arrangements are respectively provided with header information which is required in the decoding operation.

FIG. 4B shows an example of the arrangement of the respective headers. In more detail, each video sequence has a sequence header added, each GOP has a GOP header added, and each picture sequence has a picture header added. The image signal header detector 35 outputs these header Information to the memory.

FIGS. 4F to 4I show an example of data arrangement of the picture signal and the like except for the header information, where FIG. 4F shows a data arrangement of the picture signal, FIG. 4G shows a data arrangement of MBS signal, FIG. 4H shows a data arrangement of macro block signal contained in the MBS signal, and FIG. 4I shows a data arrangement of a 6-block signal contained in the macro block signal. When the special reproduction data is generated, only a packet containing a content of one picture previously indicated by the picture signal is used among the PES packet. As shown in FIG. 4I, the value of DC component of fixed-length code of each block, low band component of AC component of variable length code and EOB (End of Block) added to each block end are extracted to produce special reproduction data.

Figure 4J:
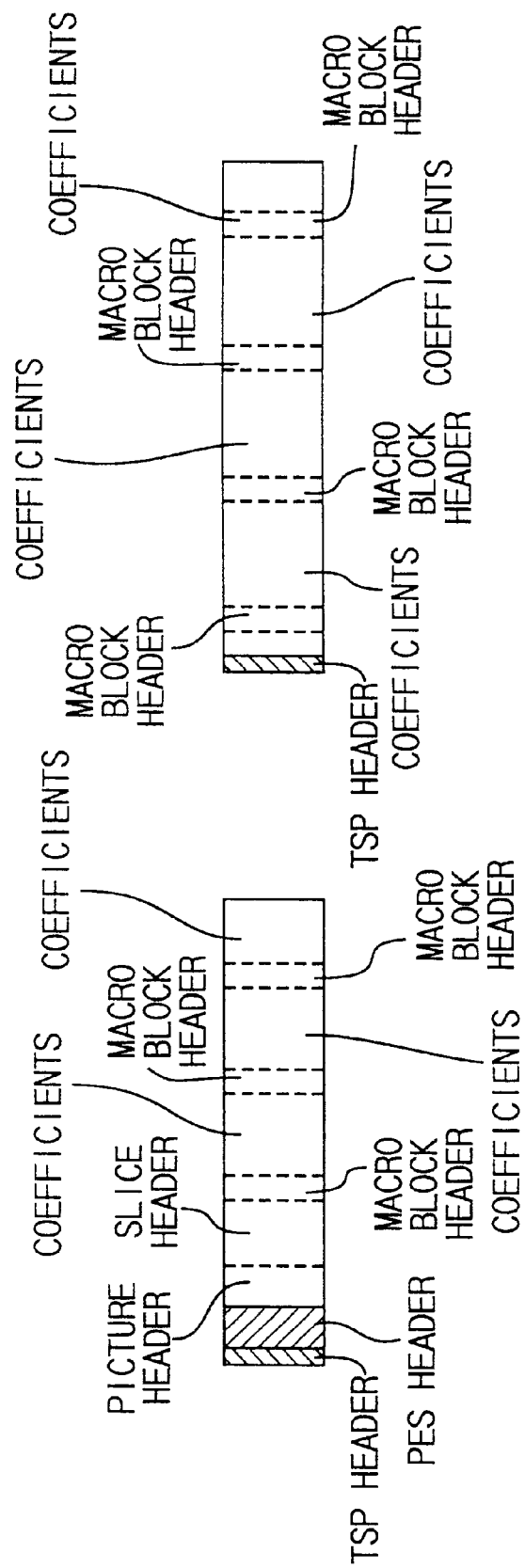
FIG. 4J is a view showing a high speed reproduction packet generated by a high speed reproduction packet generator of the present invention.

The high speed reproduction packet (HSRTP) generator 38 is fed with various information inputted such as, header information of a transport packet stored in the memory 37, header information contained in the PES packet, attachment information of an image signal, and high reproduction data outputted from the high band factor remover 36. These signals are generated and recorded in a transport packet format same as that at the input time serving as a recording unit on the magnetic tape as shown in FIG. 4J.

In the decoding information detector 39, although an interference information signal against the input signal in the header information is detected in this example, it is not limited to this and a copy information signal may be detected instead of the interference information signal. In this case, the decoding information detector 39 is fed with copying times up to the current time as a copying information signal, and when the copying times exceed a threshold, a copying flag is set unable to copy, and the subsequent recording operation is not executed.

EXAMPLE 1 OF RECORDING PACKET CONVERTER AND SIGNAL RECONSTRUCTOR

The following describes the first example of the construction of the recording packet (RP) converter 5 (or 6) and signal reconstructor 17.

Figure 6A:
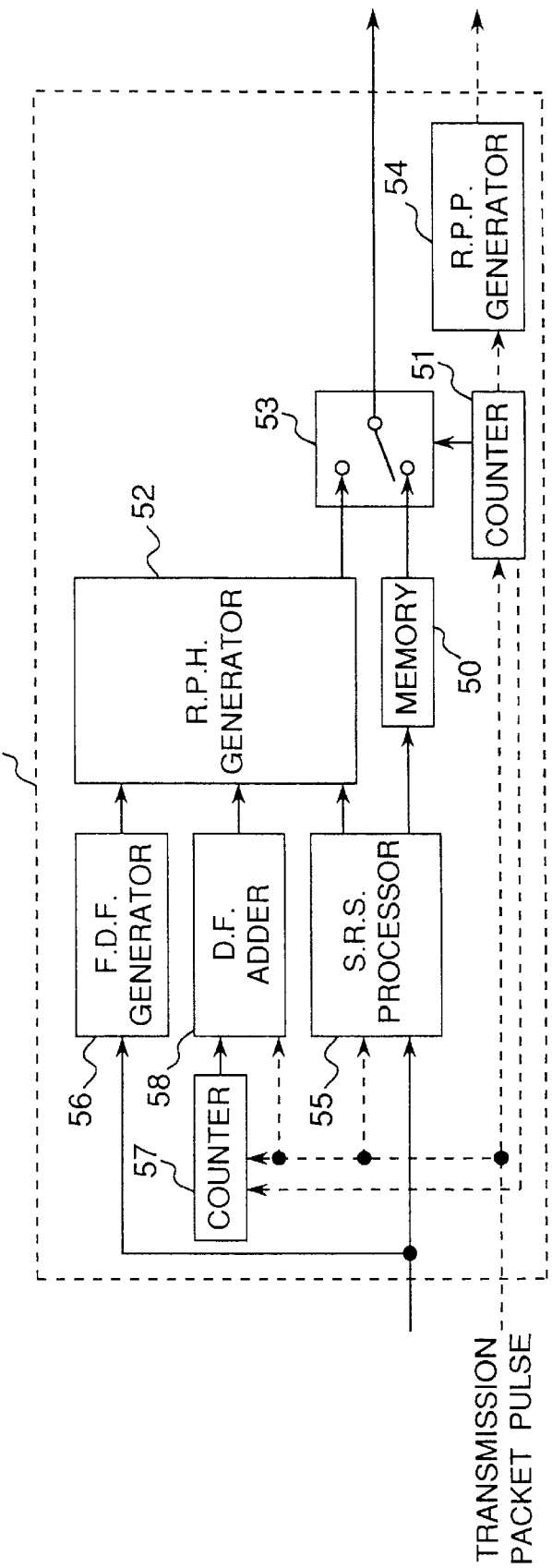
FIG. 6A is a block diagram of a recording packet converter of the present invention.

FIG. 6A shows a construction of the recording packet converter 5, which comprises a memory 50, counter 53, recording packet header (RPH) generator 52, switching unit 53, recording packet pulse (RPP) generator 54, synchronization reference signal (SRS) processor 55, frame division flag (FDF) generator 56, counter 57, and division flag (DF) adder 58.

Figure 6B:

The switching unit 53 is controlled with use of the transmission packet pulse and count value of the counter 51 to thereby form one group from two transmission packets (TP0, TP1) each having 188 bytes as shown in FIG. 6B.

A transport packet extra header (TPexH) of 3 bytes is added to the header (TPR0, TPH1) of each transmission packet, and thereafter the one group is separately divided into five data parts.

The operation of the synchronization reference signal (SRS) processor 55 will be described later.

Figure 6C:
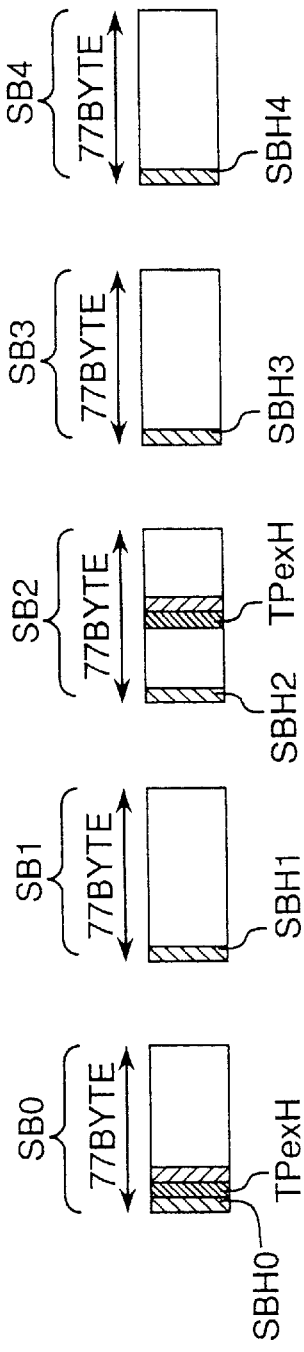
FIGS. 6E, 6C and 6D are views for explaining the first way of packet conversion of the present invention.

As shown in FIG. 6C, one byte of sync block header (SBH-0 to SBH-4) generated by the recording packet header generator 52 is added to each of the five data parts to form five sync blocks (SB0, SB1, SB2, SB3, SB4) each having a data length of 77 bytes.

Each sync block header is provided with various flag information to be recorded therein such as, a frame division flag renewed at every frame by the frame division flag generator 56, information identifying five sync blocks distinguished by the counter 57 or identifying the group formed in a unit of five sync blocks, a flag indicating whether the sync block is related to the normal reproduction data or related to the special reproduction packet.

Figure 6D:
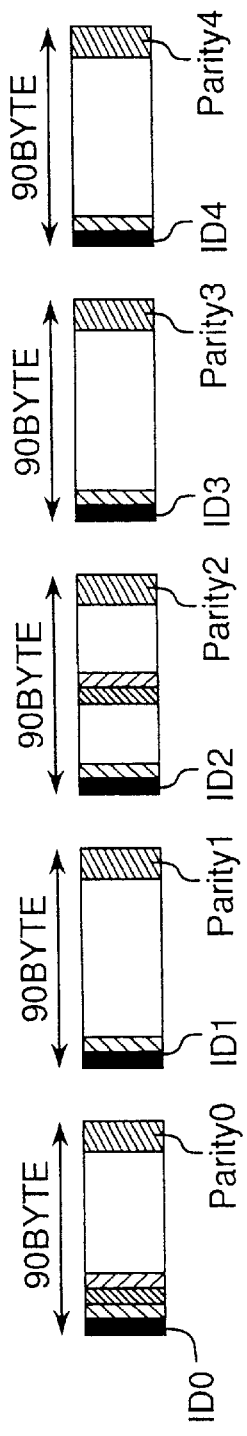

As shown in FIG. 6D, each sync block is provided with ID information added thereto by means of the formatter 9 and further provided with an error correction parity bit (Parity 0, 1, 2, 3, 4) added thereto by means of the error correction coder 20 in the recording circuit 10.

Figure 6E:
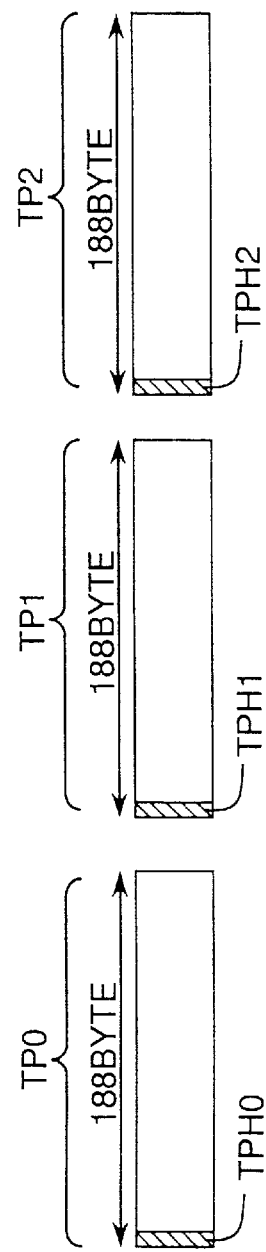
Figure 6F:
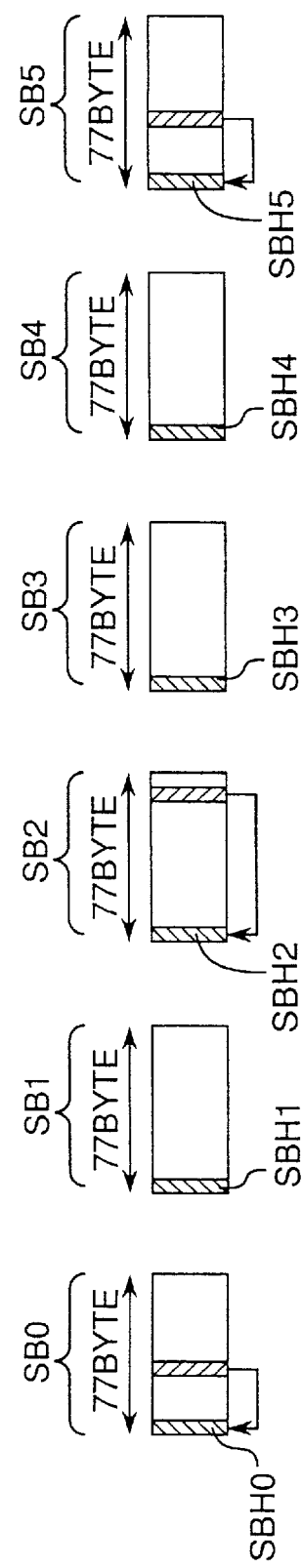
Figure 6G:
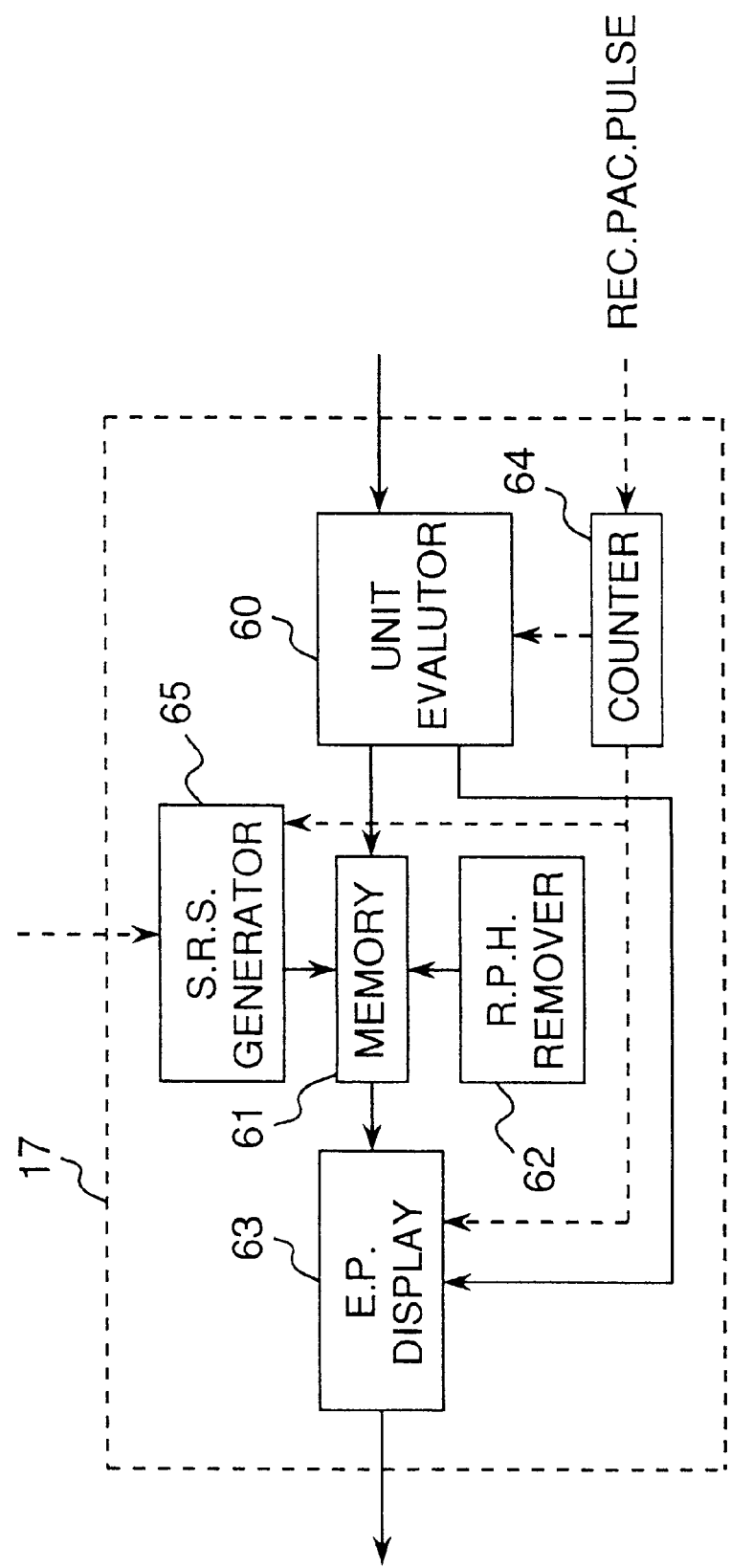
FIG. 6G is a block diagram of a first example of a signal reconstructor according to the present invention.

FIG. 6G shows a construction of the signal reconstructor 17 which comprises a unit evaluator 60, memory 61, recording packet header (RPE) remover 62, error packet (EP) display unit 63, counter 64, and synchronization reference signal (SRS) generator 65.

In this example of the signal reconstructor 17, the data except for the header added when forming the five sync blocks is rearranged in the order of the two packets same as that at the time of input and the rearranged data is then outputted.

The unit evaluator 60 judges whether or not the five sync blocks are completely provided for forming one group based on the information added to each sync block header and simultaneously judges based on the input error evaluation pulse whether or not there exists a sync block to which error-correction was not effected.

When the five sync blocks are completely provided for one group, the sync block header is removed by the recording packet header remover 62 to reconstruct the transport packet to be generated.

Whereas, when the five sync blocks are not completely provided, or when there exists an error in the sync blocks, it is judged by the error packet display unit 63 in which transmission packet the outstanding sync block including an error occurrence is located, and a flag (i.e., error-indicator-flag) indicating this packet being an error packet is established in the header of the transport packet including the part of the error occurrence. Thus, after reproduction, it is possible to judge in the decoding portion whether an error packet exists.

According to the method described above, since the dividing positions of a transmission packet can be confirmed, it is possible to prevent the error from affecting on the data portion except for the outstanding transmission packet.

By recording the information related to the format of the transmission packet of the input signal, the dividing position of the transmission packet can be easily confirmed, and error propaganda and effect of overwriting can be suppressed within the range of one transmission packet.

As described above, interconnection within a packet is stored as an additive information among the transmission packets and sync blocks, an error flag can be established for prevent the reconstruction of the transport packet to be outputted when the five sync blocks are not completely provided as shown in this embodiment. Thus, error propaganda and effect of overwriting can be suppressed within the range of one transmission packet.

In the first example, generally in the case where p pieces of normal reproduction packets or special reproduction packets are recorded at every m pieces of sync blocks, at least one division information is recorded in each of the m pieces of sync blocks as disclosed in the present embodiment, all the p pieces of the normal reproduction packets or special reproduction packets can be identified among the m pieces of sync blocks. In addition, by recording in each sync block the information as to whether all the p pieces of normal reproduction packets or high, speed reproduction packets are recorded within the m pieces of sync blocks, when e.g. p pieces of packets are not completed, the data output can be prevented in the reproduction mode.

Moreover, although two transport packets TP0 and TP1 are formed of five sync blocks (SB0–SB4) in this embodiment, it is not limited to this and any number of the transport packets can be applied for the number of the sync blocks. For example, one transport packet may be composed of three sync blocks.

Moreover, although each sync block is provided with an additive information added thereto, the type and position of the information to be added are optional.

SECOND EXAMPLE OF RECORDING PACKET CONVERTER AND SIGNAL RECONSTRUCTOR

The following describes a second example of the recording packet converter and signal reconstructor with reference to FIGS. 6E and 6F.

The second example of the construction of the recording packet converter is similar to that of the first example except for the dividing timing into sync blocks by the counter 57.

The input signal is subjected to recording packet conversion so as to be divided at every 77 bytes in sequence in the order of transmission order not in a unit of two transport packets. In this case, the input signal is recorded in a sync block format as shown in FIG. 6F, where SBR0, SBH1, SBR2, SBR3 and SBE4 denote sync block header data. By means of the transmission packet division data (TPD) generator 59, the dividing position data of the transport packet data is recorded in the sync block header.

Figure 6H:
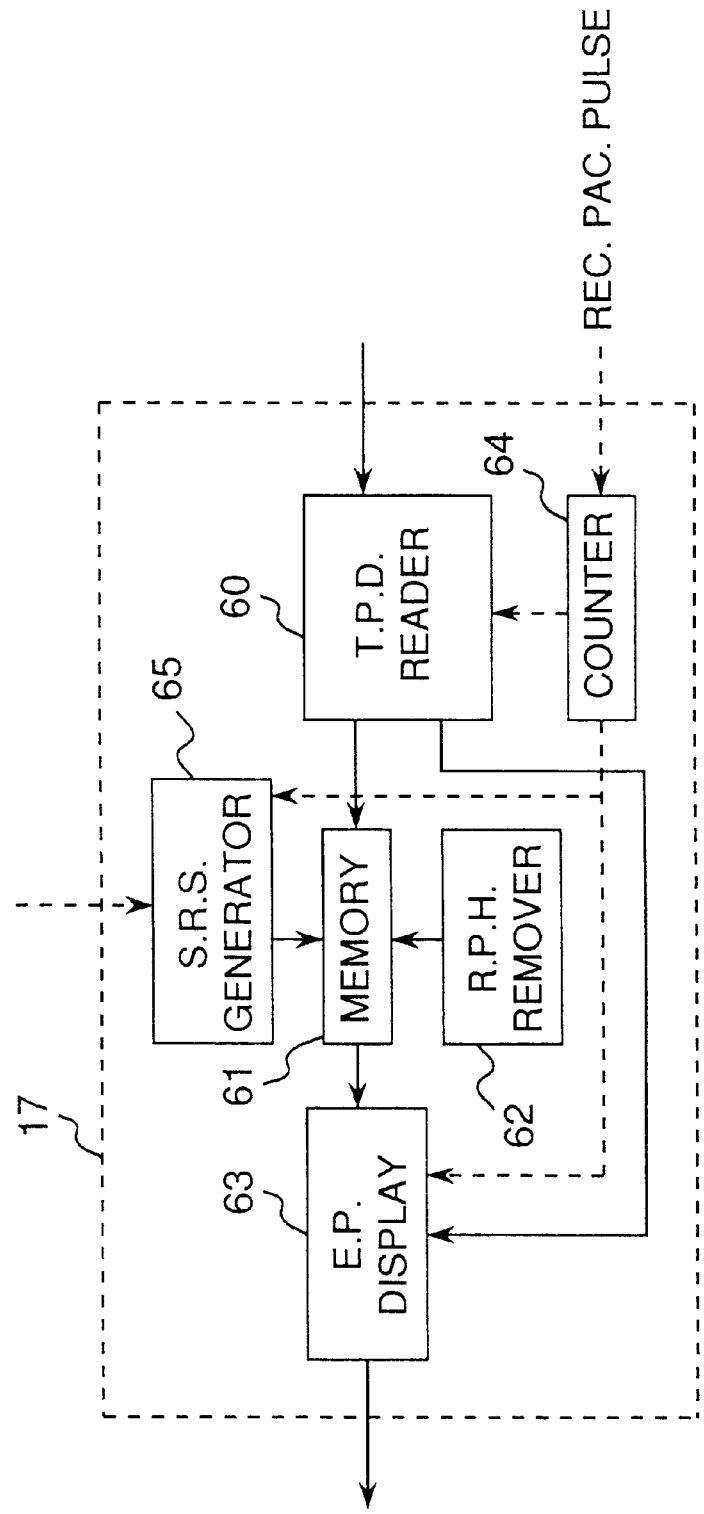
FIG. 6H is a block diagram of a second example of a signal reconstructor according to the present invention.

FIG. 6H shows the second example of the signal reconstructor 17 which comprises a memory 61, recording packet header (RPH) remover 62, error packet (EP) display unit 63, counter 64, synchronization reference signal (SRS) generator 65, transmission packet division data (TPD) reader 66, having a similar construction to that of the first example shown in FIG. 6G. Generally in similar manner to that of the first construction, the transport packet is reconstructed by removing the sync block header. When an error remains in a sync block, the dividing position of the transport packet located on the sync block header can be confirmed by means of the transmission packet division data reader 66, whereby error display can be effected similarly to the first example.

According to this example, since the division position of the transmission packet can be confirmed, the error can be prevented from affecting on the other data except for the outstanding transmission packet.

Moreover, by recording the information as to the format of the transmission packet of the input signal, the dividing position of the transmission packet can be easily confirmed and error propaganda and effect of overwriting can be suppressed within the range of one transmission packet.

FRAME DIVISION FLAG GENERATOR

The following describes the operation of the frame division flag (FDF) generator 56 of the R.P. converter 5 with reference to FIGS. 7A, 7B, 7C and 7D.

The frame division flag generator is fed with data related to frame division in the compressed image data in the input signal. For example, in the case of using MPEG signal, data of sequence header, GOP header, picture header and the like data is read so that the frame division can be detected.

An example in the case of using a special reproduction signal is described as following.

The frame division flag generator 56 generates information indicating each frame division of the special reproduction data. In the special reproduction mode, by storing the division information of the special reproduction data, the special reproduction data corresponding to one frame can be stored in the memory to be outputted.

FIG. 7A shows a recording pattern in which frame identification data for identifying the special reproduction signal at every frame is added to each sync block. Thus, the frame identification numbers (f−1, f, f+1) are recorded in the packet on each of the tracks for identifying the special reproduction frames. In the special reproduction mode, the signals of the same frame are collected and outputted as much as possible, and therefore the frames forward and backward can not be mixed, resulting in improvement of image quality.

As described above, by recording the information indicating the division of the auxiliary frame data corresponding to each auxiliary frame in the recording operation, the auxiliary frame data corresponding to one frame can be easily collected and the mixture of the frames can be prevented in the special reproduction mode. In particular, also in the reverse reproduction mode, since the auxiliary frame data can be collected in a unit of one frame, the data for one frame can be easily rearranged reversely.

In addition, as a method of indicating the frame identification information for identifying the special reproduction signal at every frame, it is not necessary to limit to this example that the signal for one special reproduction frame is recorded in a unit of track, and any is recording unit can be utilized.

Moreover, it is not necessary to limit the frame identification information indicated as f−1, f and f+1, and any reference numeral can be utilized for indicating this information so long as the order of frames before and after can be distinguished.

The above feature of the operation can be utilized for the case of the normal reproduction signal to obtain the frame division information in a similar manner.

In addition, instead of recording a division flag of a frame in each sync block, the frame division information can-be recorded in the AUX sync block.

With the operation as described above, a flag indicating a type and position of division of a frame is recorded in the AUX sync block as shown in FIG. 1D.

FIGS. 7B, 7C, and 7D show a relationship between the image signals and the recording tracks. It is to be noted here that the header portion of I picture, namely, the header portion of GOP and the terminating position of I picture portion are recorded as the frame division information.

Next, the reproduction operation is described as following.

In the case where a flag for setting position in magnetic tape reproduced from the AUX sync block establishes the dividing positions at each sequence, GOP and frame in the magnetic tape, normal reproduction transmission packets are generated at each of the sequence, GOP and frame. Otherwise the case, transmission packets are generated at any unit, for example, at an interval of 1/30 second.

When in executing an overwriting operation, by overwriting after the terminating position of the recorded data, the data can be connected at a redundant boundary portion. Moreover, the data portion compressed by inter-frame coding for still image picture transmission can be separately taken out.

As described above, dummy data is supplied for the portion after the dividing positions of the transmission packet, GOP and the like of the input signal, in a unit of sync block, track and the like on the recording medium, whereby the header position of the division of the subsequent input signal can be located in the header frame in a unit or recording, whereby the header position can be further easily detected. Moreover, the effect of overwriting can be minimized.

It is to be noted that, although the dividing position of I picture is described in this example, information of dividing positions of other frame can be utilized. In particular, since the starting position of I picture or P picture subsequent to B picture corresponds to a portion to which bidirectional prediction is not effected, the disturbance in frame due to te previous data can be avoided even when the data after that division is rewritten by overwriting.

SYSTEM CONTROLLER

Figure 8A:
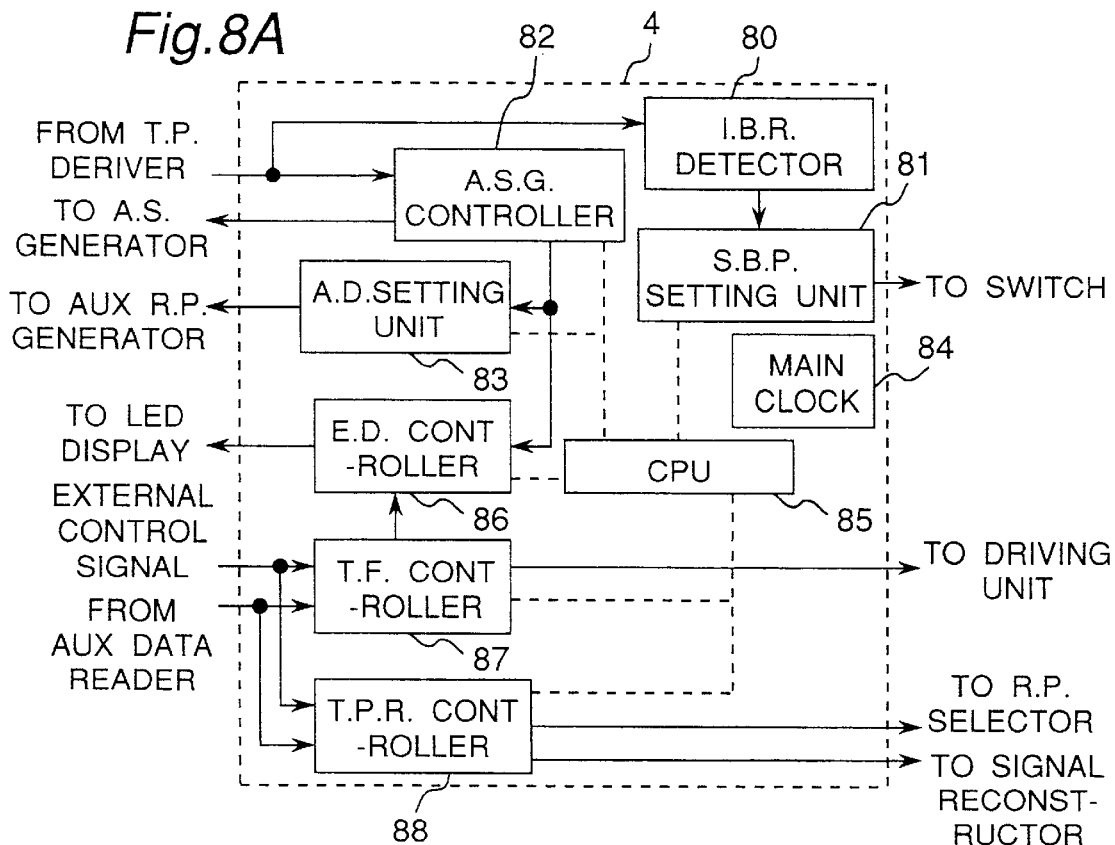
FIG. 8A is a block diagram of a system controller of the present invention.

FIG. 8A shows a construction of the system controller 4 which comprises an input bit rate (IBR) detector 80, sync block position data (SBP) setting unit 81, auxiliary signal generation (ASG) controller 82, AUX data (AD) setting unit 83, main clock 84, microprocessor (CPU) 85, external display (ED) controller 86, tape feeding (TF) controller 87, and transmission packet reconstruction (TPR) controller 88. The TPR controller 88 generates transmission packet of input bit rate, transmission packet size and data indicating presence or absence of interference signal, and in the case of a signal which can not be recorded, the content thereof is informed to the external display controller 86 by controlling the LED display.

The obtained data is set by the AUX data setting unit 83 so that the data together with data of recorded date and time and the like data in a predetermined data arrangement pattern of AUX sync block.

In the TP controller 87, a tape feeding speed setting signal of the driving unit is produced based on the external control signal indicating the tape speed set by a operator.

At this stage, data relating to presence or absence of a special reproduction data, types of the data and repetition times recorded in the AUX sync block are obtained through the AUX data reader 12, whereby the tape feeding speed is controlled so that the special reproduction data can be correctly reproduced.

The AUX data is also fed to the TPR controller 88, and when a special reproduction is intended to be executed under the condition that there exists no special reproduction data, the content of impossibility of generation of a special reproduction data is confirmed by controlling the LED display by means of the external display controller 86.

The TPR controller 88 controls the recording packet selector 16 and signal reconstructor 17 so that, the transmission packet of the reproduction signal is constructed from the recording packet of the normal reproduction signal in the normal reproduction mode or from the recording packet of the special reproduction data in the special reproduction mode.

The following describes the operation thereof in the recording mode.

The input bit rate detector 80 generates an average data rate based on the count value of the input signal in a predetermined time period, external control signal, or data relating to the bit rate contained in the input signal.

For example, when using an MPEG signal as an input signal, the number of multiplexed programs in the data and information as to the data rate of each program are recorded in a header portion of a special transmission packet called as "PSI", these information are read for obtaining the mean value of data rate. Alternatively, the data rate of the input signal at the current moment can be calculated according to variation of the input amount fed to the buffer memory 1 or storage amount of the data stored in the buffer memory 1.

In the case where the difference from the rate of the input signal can not be absorbed because the recording circuit 10 executes the recording operation at a constant data rate, the switching timing of the switching selector 8 is controlled by the sync block position data setting unit 81 so that a sync block of dummy data is added to be recorded for compensating the difference.

At this stage, a flag indicating the starting and terminating positions of recording of the dummy data may be formed by the sync block position data setting unit 81 and the flag may be recorded in the AUX data sync block, instead of recording in each sync block header the flag identifying whether the data is dummy data, as described before.

Thus, in addition to the input compressed television signal, the dummy data sync block and flag indicating the position of the dummy data are recorded on the magnetic tape 101.

The flag indicating the position of the dummy data is derived out of the AUX data sync block by means of the AUX data reader 12 so that the recording packet selector 16 identifies based on the flag and ID data whether the data is related to the auxiliary sync block, normal reproduction sync block, or dummy data sync block. In the case of a dummy data sync block, this data is abandoned and subsequent process is not carried out with no data outputted.

By adding the dummy data of data rate corresponding to the difference between the recording rate of the recording medium and the input transmission rate of the input signal, the data can be recorded only according to the recording rate of the recording medium irrespective of the difference from the transmission rate of the input signal and variation therefrom.

In addition, by recording the data relating to the boundary position between the input signal and the added signal, the position of the dummy data can be confirmed in the reproduction mode so that the input signal can be easily separated and reproduced.

In this example, although the number of multiplexed programs in the data and information as to the data rate of each program are read for obtaining the mean value of data rate, alternatively, the data rate of the input signal at the current moment can be calculated according to variation of the input amount fed to the buffer memory 1 or storage amount of the data stored in the buffer memory 1, it is to be noted that, when the dummy data corresponding to the difference of the rate is added to be generated so that the buffer memory generates its output data at a constant rate, the measurement of the data rate of the input signal in a predetermined time period is not necessary.

Figure 8C:
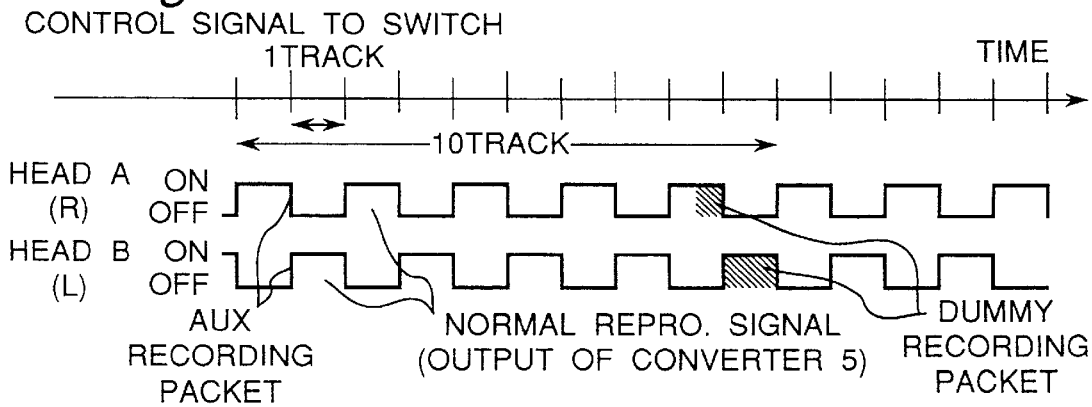
FIGS. 8C and 8D are timing charts each showing examples of a control signal of FIGS. 8B and 8E respectively.
Figure 8D:
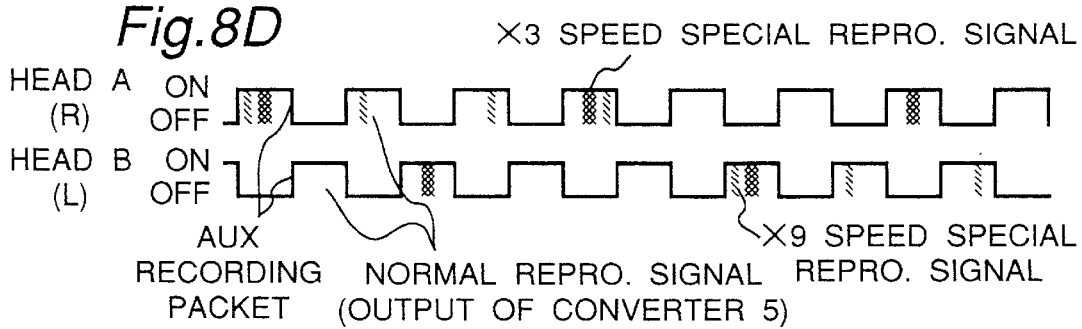
Figure 8B:
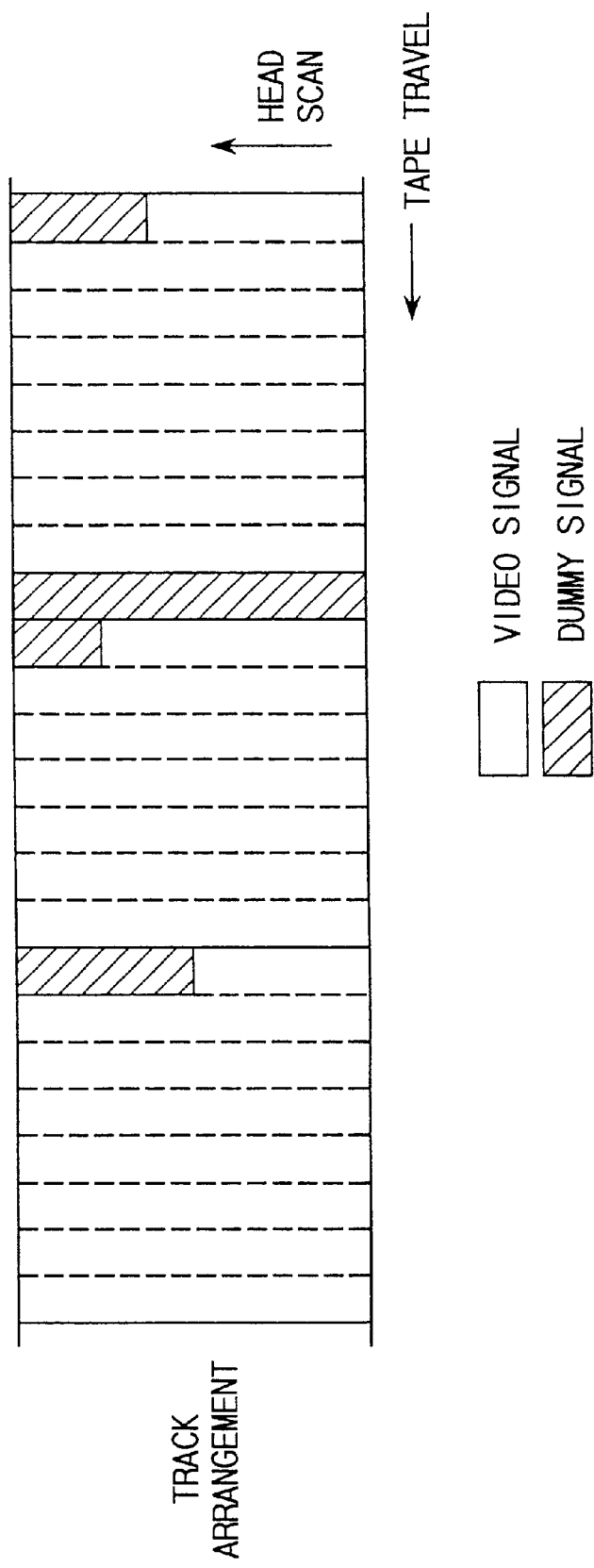
FIG. 8B is a view of a track pattern for explaining an operation of a system controller of the present invention.

In the sync block position data setting unit 81, as shown in FIG. 8B, the positional data can be also set in such a manner that, any optional number of tracks, e.g., ten tracks are assembled as one unit to form one group of tracks so that the data of transport packets is not located extending over different groups of tracks.

FIG. 8C shows an example of a control signal fed to the switching selector, where the location of the AUX recording packet, normal reproduction signal and dummy recording packet are depicted in a group of ten tracks.

As a result, in such a case that an error correction code is added in a unit of ten tracks, the matching or integrity is improved when in control operation.

When the header position of the track on the magnetic tape has a sync block recorded with the header of the transport packet to be started therefrom, it is avoided that one transport packet is recorded extending over different two tracks, facilitating to return back the data to the transport packet in the reproduction mode. At this stage, a dummy data sync block is supplied to fill the remaining portion.

FIG. 8E shows a recording pattern as a third example of setting a sync block positional data in the sync block position data (SBP) setting unit 81, where the tape track has both a region for recording a normal reproduction signal and a region for recording a special reproduction signal.

For example, since tape feeding speed is increased in the high reproduction mode, only a sync block signal of a limited portion on the tracks can be read. Under consideration of this matter, by locating the sync blocks having a special reproduction signal recorded therein on a locus on a magnetic tape to be scanned by the magnetic head, a lot amount of special reproduction signals can be effectively read even in the reproduction mode.

FIG. 8D shows an example of a control signal fed to the switching selector, where the location of the AUX recording packet, normal reproduction signal is depicted in a group of ten tracks.

Figure 8F:
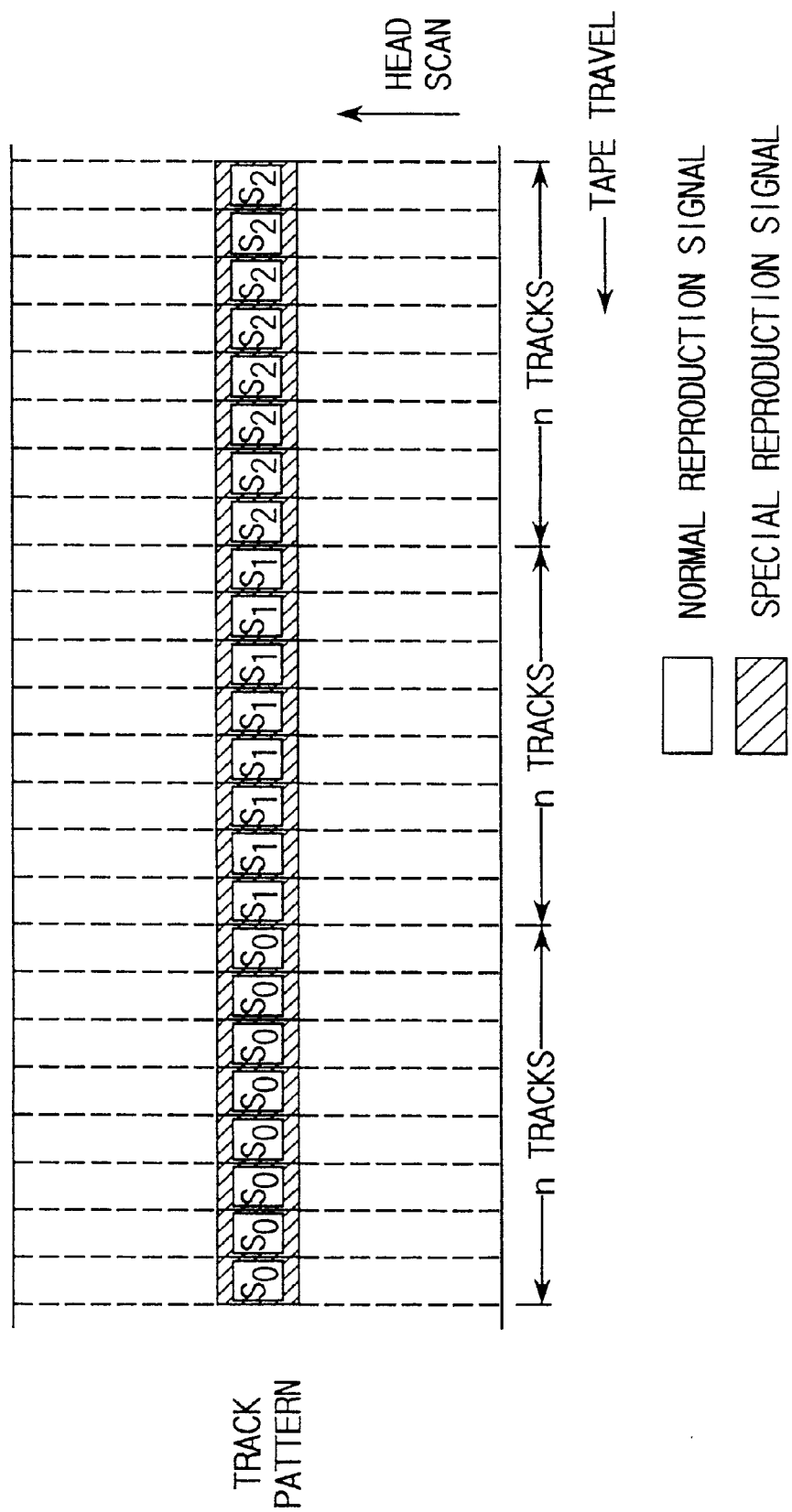
FIG. 8F is a view of a track pattern for explaining a fourth example of an operation of a system controller of the present invention.

FIG. 8F shows a fourth example of a recording pattern, where the same special reproduction signals are repeatedly recorded on the tracks continuously formed on the magnetic tape. By repeatedly recording the same special reproduction signals on the serial n tracks, omission of reading the special reproduction signal can be prevented even if the head is displaced from its scanning tracks.

For example, in a ×8 high speed reproduction mode, by recording the same special reproduction signal 16 times in a zone belt pattern, either Lch head or Rch head may read the signal in the special reproduction region without fail. In this case, a complicated tracking accuracy is not necessary. Moreover, similar effect can be obtained by executing two times of scanning of either the Lch or Rch head.

At this stage, since an identification signal for identifying the recording signal is added to each sync block, therefore the signal can be correctly decoded in the special reproduction mode even when the special reproduction signal is recorded in any optional packet on the tape track.

Figure 8G:
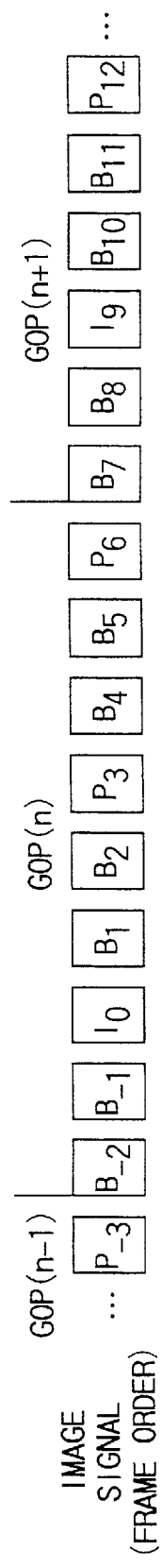
FIGS. 8G and 8H are views each showing a track pattern for explaining a fifth example of an operation of a system controller of the present invention.
Figure 8H:
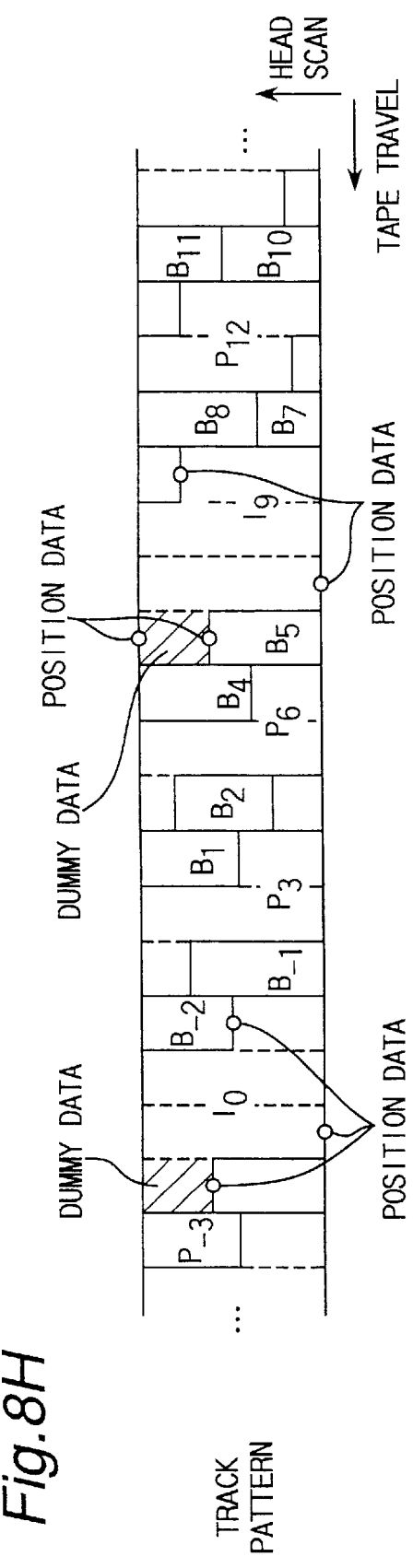

FIGS. 8G and 8H show a relationship between the image signals and the recording tracks as a fifth example of the recording pattern, which is similar to that shown in FIGS. 7B, 7C and 7D except for recording dummy data after dividing positions.

In this example, by providing dummy data recorded on portions after dividing positions, the starting positions of GOP always correspond to the sync block positions, and therefore the dividing position of GOP can be further easily identified.

Moreover, it is advantageous that the frame can be correctly reproduced without disturbance even when overwriting of a track header which is comparatively easily realized.

As described above, the dummy data is supplied to the portions after the dividing positions of transmission packet and GOP of input signal in a unit of sync block and tracks formed on the recording medium, whereby the header position of the division of the subsequent input signal can be located at a header frame of the recording unit, facilitating to detect the header position. Also, the effect of the overwriting can be minimized.

It is to be noted here that, although the dummy data is recorded in a unit of tracks, other unit can be utilized. In particular, in the case where error correction or rearrangement is performed extending over a plurality of tracks in a recording mode, it is preferable that the dummy data is adjusted so that the header positions coincide in a unit of the tracks of the same number. Moreover, although the dividing positions are detected in a unit of frames, other unit such as GOP, sequence, MBS and macro blocks may be used.

SYNCHRONIZATION REFERENCE SIGNAL PROCESS

Figure 9A:
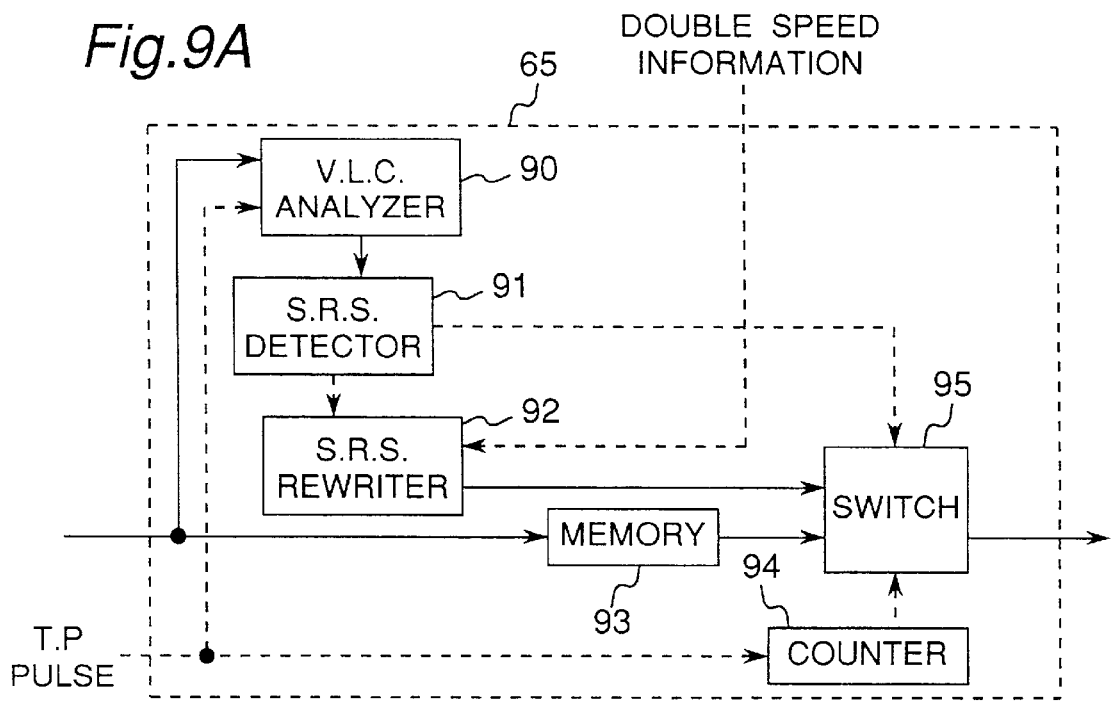
FIG. 9A is a block diagram of a synchronization reference signal generator in the first example of synchronization reference signal processing according to the present invention.

FIG. 9A shows a first example of a construction of the synchronization reference signal generator 65 shown in FIGS. 6G and 6E, which comprises a variable length code (VLC) analyzer 90, synchronization reference signal (SRS) detector 91 and synchronization reference signal (SRS) rewriter 92.

When the generated special reproduction data is converted to a transmission packet format, the synchronization reference signal is detected by means of the synchronization reference signal detector 91, and the resultant output is rewritten by means of the synchronization reference signal rewriter 92.

Figure 9D:
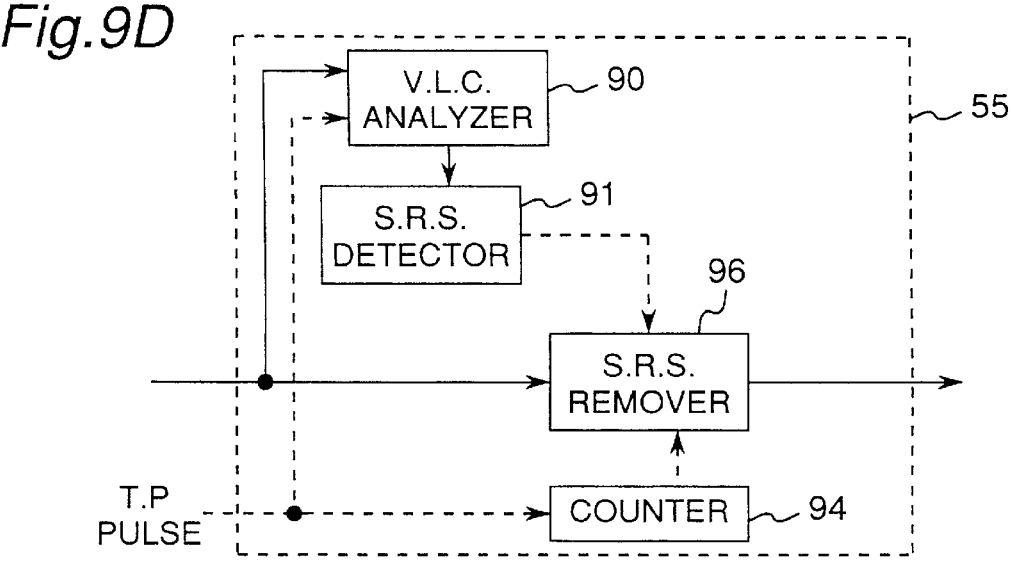
FIGS. 9D and 9E are block diagrams of a synchronization reference signal processor and synchronization reference signal generator, respectively, in the third example of the synchronization reference signal processing according to the present invention.
Figure 9E:
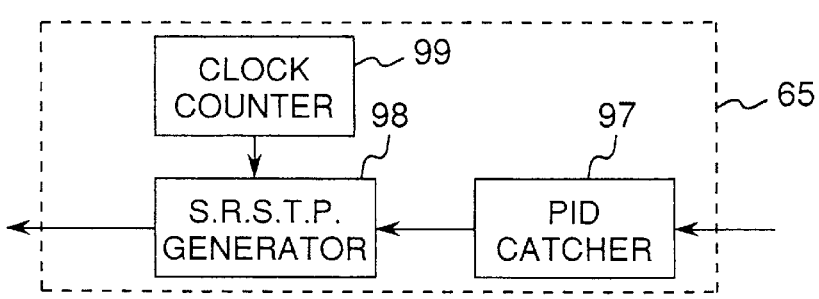
Figure 9B:
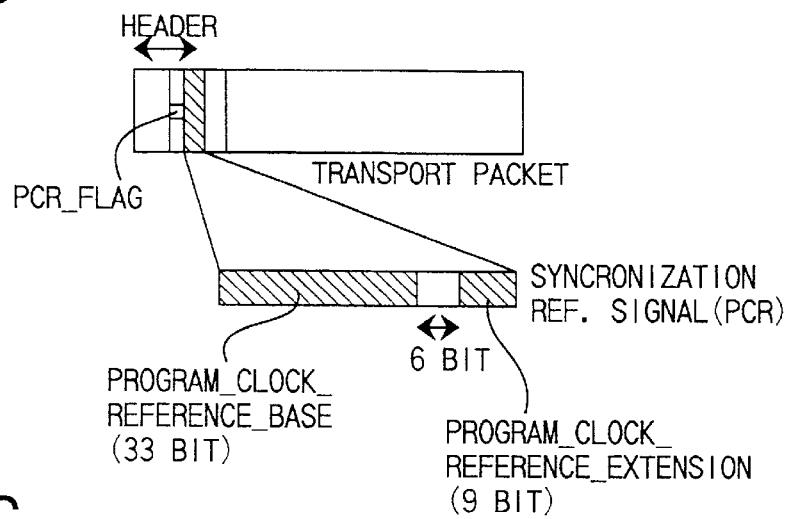
FIGS. 9B and 9C are views for explaining the synchronization reference signal in MPEG2 signal.
Figure 9C:
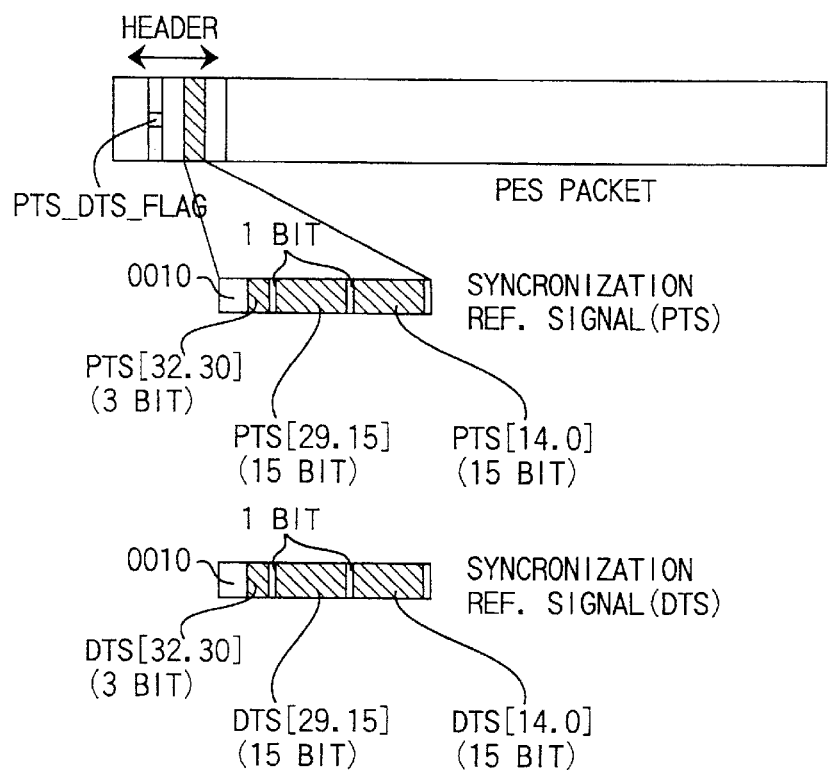

There is some case that the header portion of the transmission packet of MPEG2 signal contains a synchronization signal of any one or all of the PCR (Program Clock Reference), PTS (Presentation Time Stamp), DTS (Decoding Time Stamp) shown in FIGS. 9B and 9C. Among these portions, the parts indicating the time point, namely, the program_clock_reference_base 33 bits or program_clock_reference_base 33 bits plus program clock_reference_extension 9 bits shown by inclined lines portion in PCR, and the portions of 33 bits (3+15+15 bits) shown by inclined line portion in PTS and DTS, are rewritten in accordance with the tape drive speed in the special reproduction mode. For example, when the reproduction speed is increased two times, the time difference between each adjacent two PCRs becomes half. The switch 95 selects the normal reproduction data or special reproduction data, which the output is applied to the formatter.

As described above, according to the first example of the construction 65, by rewriting the auxiliary signal of synchronization reference signal in the reproduction mode, the special reproduction using the auxiliary signal can be performed in any reproduction speed in a range so long as the auxiliary signal can be reproduced. In this case, the synchronization reference signal processor 55 shown in FIG. 6A is not necessary.

Figure 9F:
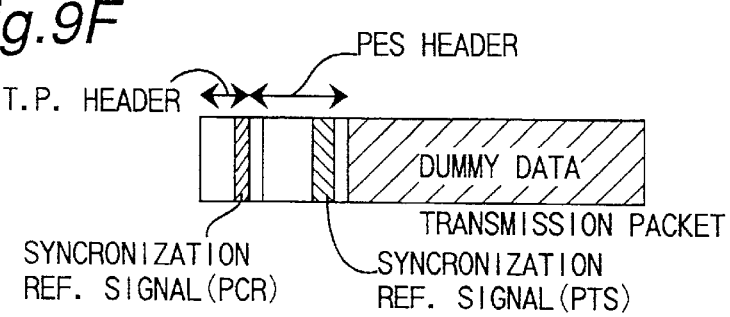
FIG. 9F is a view for explaining the synchronization reference signal sync block in a time stamp process according to the present invention.

The following describes the second example of the synchronization reference signal processing construction with reference to FIGS. 9D, 9E and 9F.

FIGS. 9D and 9E shows the second example of the construction of the synchronization reference signal (SRS) processor 55 and synchronization reference signal (SRS) generator 65 respectively, where the SRS processor 55 comprises a synchronization reference signal (SRS) remover 96 while the SRS generator 65 comprises a PID catcher 97 and synchronization reference signal transmission packet (SRSTP) generator 98.

In the SRS processor 55, a synchronization reference signal is removed from the special reproduction data by means of the synchronization reference signal remover 96.

In the SRS generator 65, a synchronization reference signal transmission packet containing the synchronization reference signal is generated and added by means of the synchronization reference signal transmission packet generator 98.

As shown in FIG. 9F, the generated packet contains PCR, PTS and DTS. Among these portions, the parts indicating a time point, namely, the portion of 13 bits depicted by inclined line portion in PCR, and the portion of 8 bits depicted by inclined line portion in PTS and DTS, are generated in accordance with the tape drive speed in the reproduction mode.

As described above, according to the second construction, by removing the synchronization reference signal of the auxiliary signal in a recording mode and adding a packet containing the auxiliary signal of the synchronization reference signal in a reproduction mode, the special reproduction using the auxiliary signal can be effected in any reproduction speed so long as the auxiliary signal can be reproduced.

In this stage, the synchronization reference signal can not be correctly generated during a period of proceeding of the reproduction speed from normal speed to high or low reproduction speed or a period of the reproduction speed is varying in the special reproduction mode. Therefore, in order to compensate this error, the SRSTP generator 98 generates the packets containing the synchronization reference signal during the periods mentioned above.

As described above, by generating the packets containing the synchronization reference signal when the reproduction speed is varied in the reproduction mode, a correct synchronization reference signal can be fed to the decoder even in the period when the reproduction speed is varied without data outputted in the reproduction mode.

The following describes the third example of the synchronization reference signal processing construction in which the construction of the sync ref. signal processor 55 is the same as that of the sync ref. signal generator 65 in the first example shown in FIG. 9A. In the third example, the rewriting of the data is executed in the recording process instead of performing in the reproduction process. In accordance with the degree of the reproduction speed applicable in the special reproduction mode, the special reproduction data corresponding to the types thereof are only generated as shown in FIG. 8E. In this stage, the position of the synchronization reference signal is detected based on the respective special reproduction data by means of the SRS detector 9., and further the synchronization reference signal is rewritten by means of the SRS rewriter 92 as shown in FIG. 9A.

In the reproduction mode, the data arrangement pattern is returned back to the pattern same as that at the generation process without adding nor rewriting the synchronization reference signal especially, whereby the additive data such as division data of sync block is removed to recover a data format which is acceptable for the external decoder.

As described above, according to the third example of the construction, by rewriting the synchronization reference signal of the auxiliary signal in the recording mode, the special reproduction can be effected at a specified reproduction speed using an auxiliary signal without rewriting the synchronization reference signal in the reproduction mode.

Embodiment 2

Figure 2A:
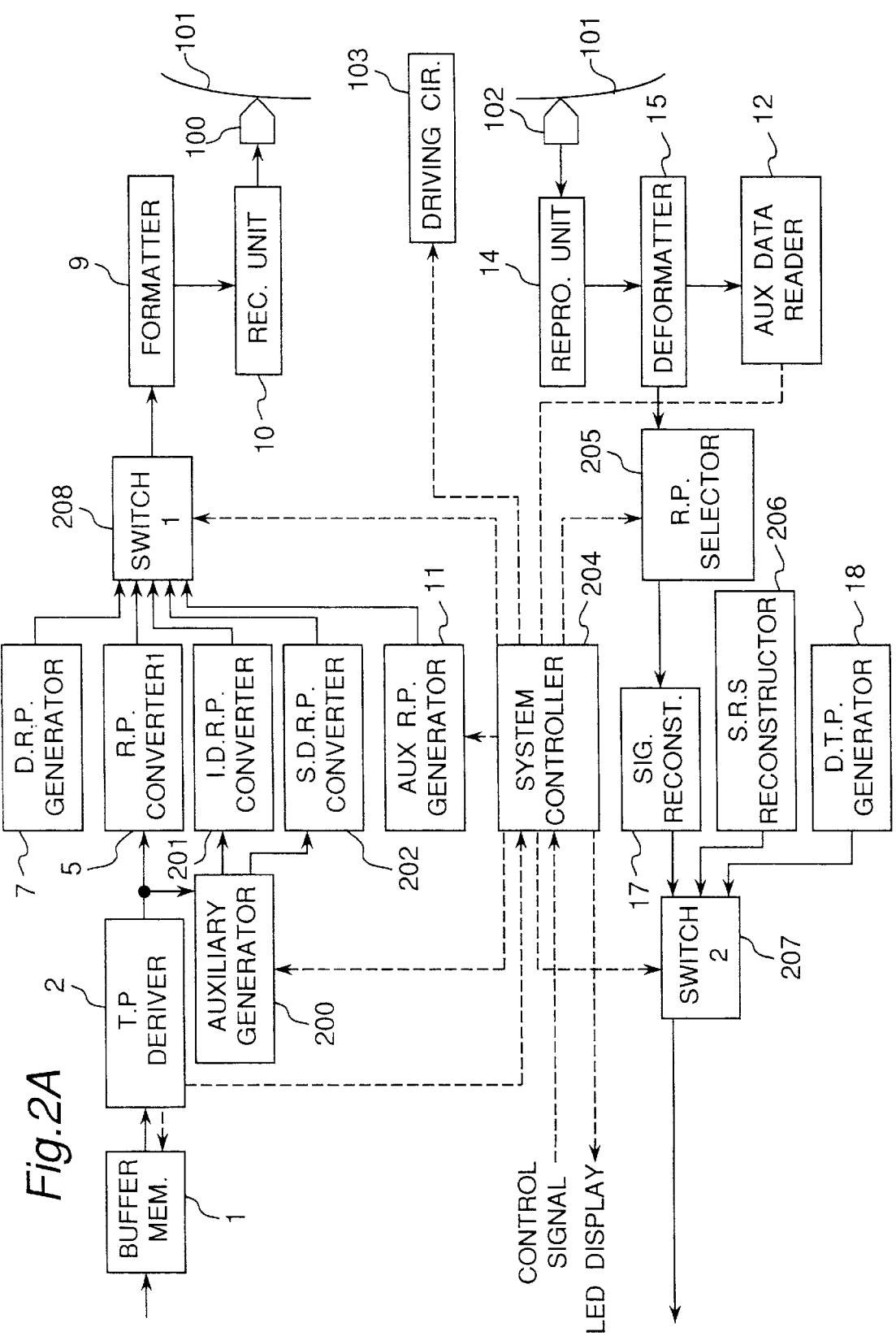
FIG. 2A is a block diagram of a digital signal recording and reproducing apparatus according to the second embodiment of the present invention.

FIG. 2A shows a block diagram of a digital signal recording and reproducing apparatus according to the second embodiment of the present invention.

As shown in FIG. 2A, this digital signal recording and reproducing apparatus comprises a buffer memory 1, a transmission packet (TP) deriver 2, an auxiliary signal generator 200, system controller 204, recording packet (RP) converter 5, image data recording packet (IDRP) converter 201, system data recording packet (SDRP) converter 202, dummy recording packet (DRP) generator 7, first switching selector 208 formatter 9, recording unit 10, AUX recording packet generator 13, magnetic recording head 100, magnetic tape 101, magnetic reproducing head 102, driving circuit 103, reproduction unit 14, AUX data reader 12, deformatter 15, recording packet (RP) selector 205, special reproduction signal (SRS) reconstructor 206, signal reconstructor 17, dummy transmission packet (DTP) generator 18, and second switching selector 207.

In the apparatus, the input digital signal is applied to the transmission packet deriver 2 through the buffer memory 1.

The system controller 204 is fed with an external control signal so as to identify whether or not the applied digital signal has an acceptable transmission packet format. When the transmission packet format of the input signal is identified to be acceptable for the apparatus, the subsequent recording processes are executed.

Whereas, in the case of having an unacceptable format for the apparatus, the content indicating that the input signal is not acceptable for the apparatus is displayed on a display panel and the recording operation is stopped.

The digital signal as well as a transmission pulse indicating the header of the detected transmission packet is outputted from the transmission packet deriver 2 at each transmission packet.

The auxiliary signal generator 200 generates an auxiliary signal separated into image data and system data with use of a partial or entire part of the digital signal applied from the transmission packet deriver 2.

The construction of the auxiliary signal generator 200 is to be described later.

It is to be noted here that, when an auxiliary data can not be generated due to interference data such as scrambles, the content indicating impossibility of generation of the auxiliary data is transmitted to the system controller 204 and then the subsequent process for generating auxiliary data is not effected.

The digital signal is fed from the transmission packet deriver 2 to the first recording packet converter 5 while a special reproduction signal is fed from the auxiliary signal generator 200 to the image data recording packet (IDRP) converter 6, and a special reproduction system data is fed to the system data recording packet converter 202, where the respective transmission packets are converted to a recording packet format called as a sync block having a fixed-length of 77 bytes which is a recording unit on the tape track as shown in FIG. 1D.

The construction of the recording packet converter is to be described later.

The header of 1 byte of the sync block is used as header information which indicates data of packets and which the header data is added to each sync block.

One bit of the sync block header is used as a flag for switching between the normal reproduction data and the special reproduction data, where a flag "0" is written in the first recording packet converter 5 for converting normal reproduction data and a flag "1" is written in the image data recording packet converter 201 and system data recording packet converter 202 for converting special reproduction data.

By means of the dummy recording packet generator 7, a dummy data sync block is generated and a flag for identifying whether or not the data is the dummy recording packet is recorded in each sync block header.

For example, assuming that the second bit of the sync block header of the special reproduction sync block is used as a flag for evaluating between the image data and the system data recording packet, and when the evaluation flag is "1", the data is evaluated as the system data.

The first switching selector 208 receives, a sync block composed of normal reproduction signals transmitted from the recording packet converter 5, a sync block composed of special reproduction signals transmitted from the image data recording packet converter 201, sync block composed of special reproduction system data transmitted from the system data recording packet converter 202, and dummy data sync block transmitted from the dummy recording packet generator 7, where the received sync blocks are adjusted in arrangement pattern based on the control signal transmitted from the system controller 4 so that the applied sync blocks are arranged in a predetermined pattern order on the tracks, and then the order-patterned sync blocks are fed to the formatter 9.

Next, the following describes the operation of the second example of the apparatus.

The recording packet selector 205 derives an identification flag from the sync block header for identifying the signal recorded in the sync block header. Then the recording packet selector 205 receives the reproduction mode data from the system controller 204 which the reproduction mode data indicates as to whether the operation is in the normal reproduction mode or in the special reproduction mode together with indication of the degree of times of the reproduction rate.

In the normal reproduction mode, selected is a sync block recording the normal reproduction signal based on the identification flag and is then transmitted from the recording packet selector 205 to the signal reconstructor 17.

Similarly, in the special reproduction mode, selected is a sync block signal which records the special reproduction image data and special reproduction system data based on the identification flag and is then fed to the special reproduction signal reconstructor 206.

According to the data contained in the AUX sync block obtained by the AUX data reader 12, when it is turned out that no special reproduction signal is generated at the time of recording, since the system controller 204 has no data in the special reproduction mode, the image picture can not generated, which the content is displayed on the display panel.

In the signal reconstructor 17, the header and the like is removed from the input sync block so as to be returned to the data arrangement pattern of the transmission packet to be generated.

With the above described construction, the special reproduction signal to be outputted in frame in the special reproduction mode is generated from the input image signal irrespective of the normal reproduction signal, and further when recording data in the sync block on the magnetic tape, also an identification flag for identifying whether the signal contained in the packet is normal reproduction signal or special reproduction signal is simultaneously recorded on the sync block header, whereby, the identification flag recorded on the sync block header is read in the reproduction mode, and also in the special reproduction mode the reproduction signal can be correctly decoded to be output, and therefore the image quality of the output displayed picture can be improved.

Moreover, by recording the special reproduction data separated into image data and system data, the redundance due to overlapping of the system portion can be reduced, and therefore the special reproduction data can be efficiently recorded.

Furthermore, by recording on the recording medium the data identifying whether or not the special reproduction packet is recorded in the recording mode, even when a special reproduction mode is selected in the reproduction mode under the condition that a special reproduction packet is not recorded, it is possible to cope with the case by generating an error message and the like.

Figure 2B:
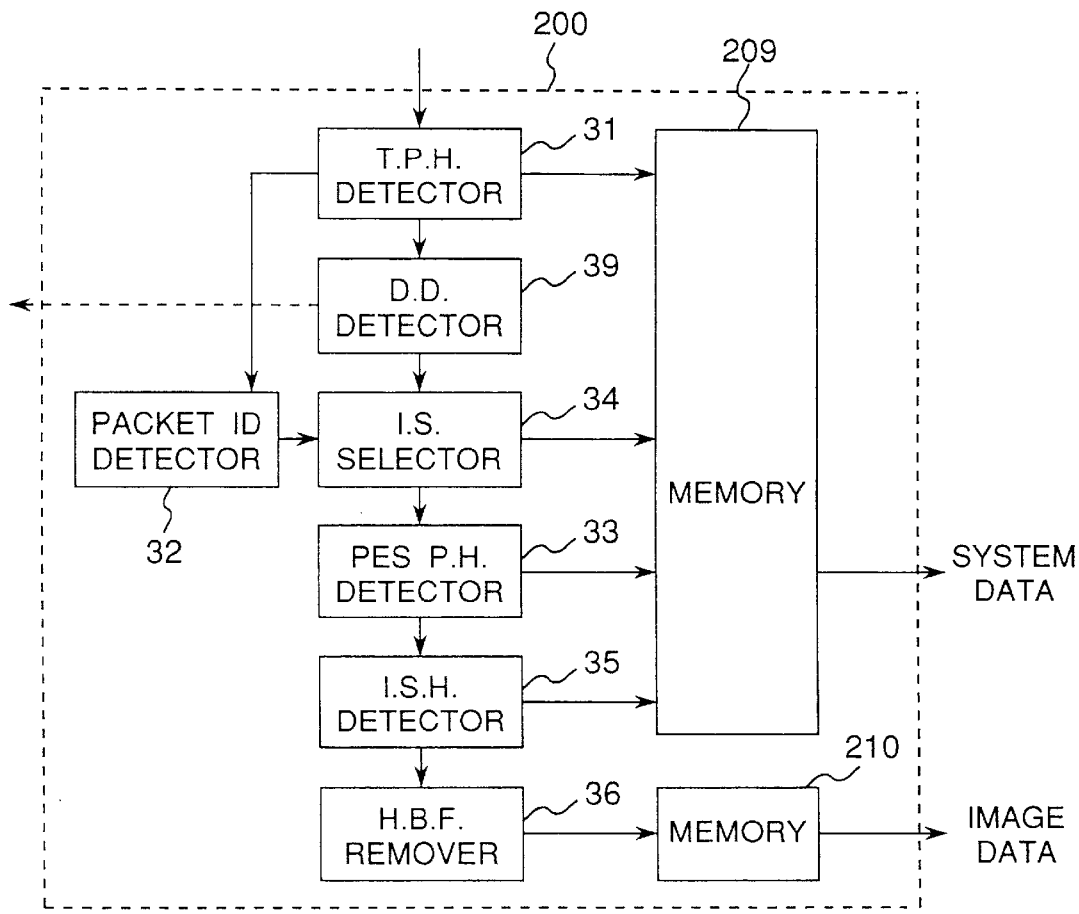
FIG. 2B is a block diagram of an auxiliary signal generator of the second embodiment.

FIG. 2B shows a construction of the auxiliary signal generator 200 which comprises a transmission packet header (TPH) detector 31, packet ID detector 32, PES packet header (PH) detector 33, image signal (IS) selector 34, image signal header (ISE) detector 35, high band factor (HBF) remover 36, and first and second memories 209 and 210.

In the image signal selector 34, when the signal contained in the transmission packet is related to an image signal, the header of the transmission packet extracted and fed to the memory 209, and the transmission packet data having its header removed is fed to the PES packet header detector 33.

In the PES packet header detector 33, the PES packet header contained in the PES packet is extracted and fed to the memory 209. The remaining PES packet having its PES packet header removed is fed to the image signal header detector 35.

The image signal header detector 35 generates system data such as external data indicating equipments currently connected to the apparatus and the connecting points therebetween, external data such as a flag indicating a type and size of the transmission packet of the signal to be recorded, and header data containing such as values of quantization table for use in the reverse quantization of the number of pixels, aspect ratio, DC and AC values, which are necessary when decoding the image signal in the reproduction mode, which the system data of header data output of the image signal header detector 35 is fed to the memory 209 to be fed to the SDRP converter 202.

Figure 2C:
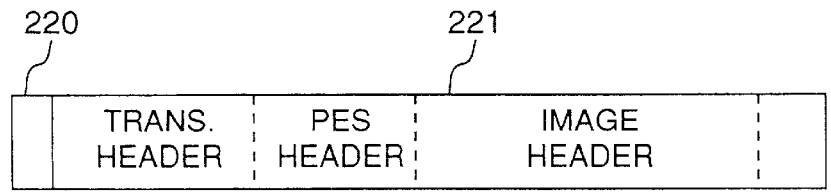
FIG. 2C is an explanatory view of a system data sync block for use in the second embodiment.

In the special reproduction system data recording packet (SRSDRP) converter 202, various data such as transmission packet header, PES packet header, and system data are recorded, and therefore a system data sync block is formed as shown in FIG. 2C, where reference numeral 220 denotes an additive data of the system data sync block and 221 denotes the system data. In the additive data 220 region, there is provided a flag indicating that the sync block is a system data sync block.

The image data signal is fed from the image signal header detector 35 to the high band factor remover 36, where a special reproduction image data is produced from the signal contained in the packet based on the DC and AC values and EOB of each block, and the output data of the remover 36 is fed to the memory 210 to be fed to the IDP converter 201.

In the special reproduction image data recording packet (SRIDRP) converter 201, the special reproduction image data is divided in a unit of 77 bytes so as to form a special reproduction image data sync block.

In the recording packet converter 5, the normal reproduction data is converted to the sync block format in a similar manner to that of the first embodiment.

Figure 2D:
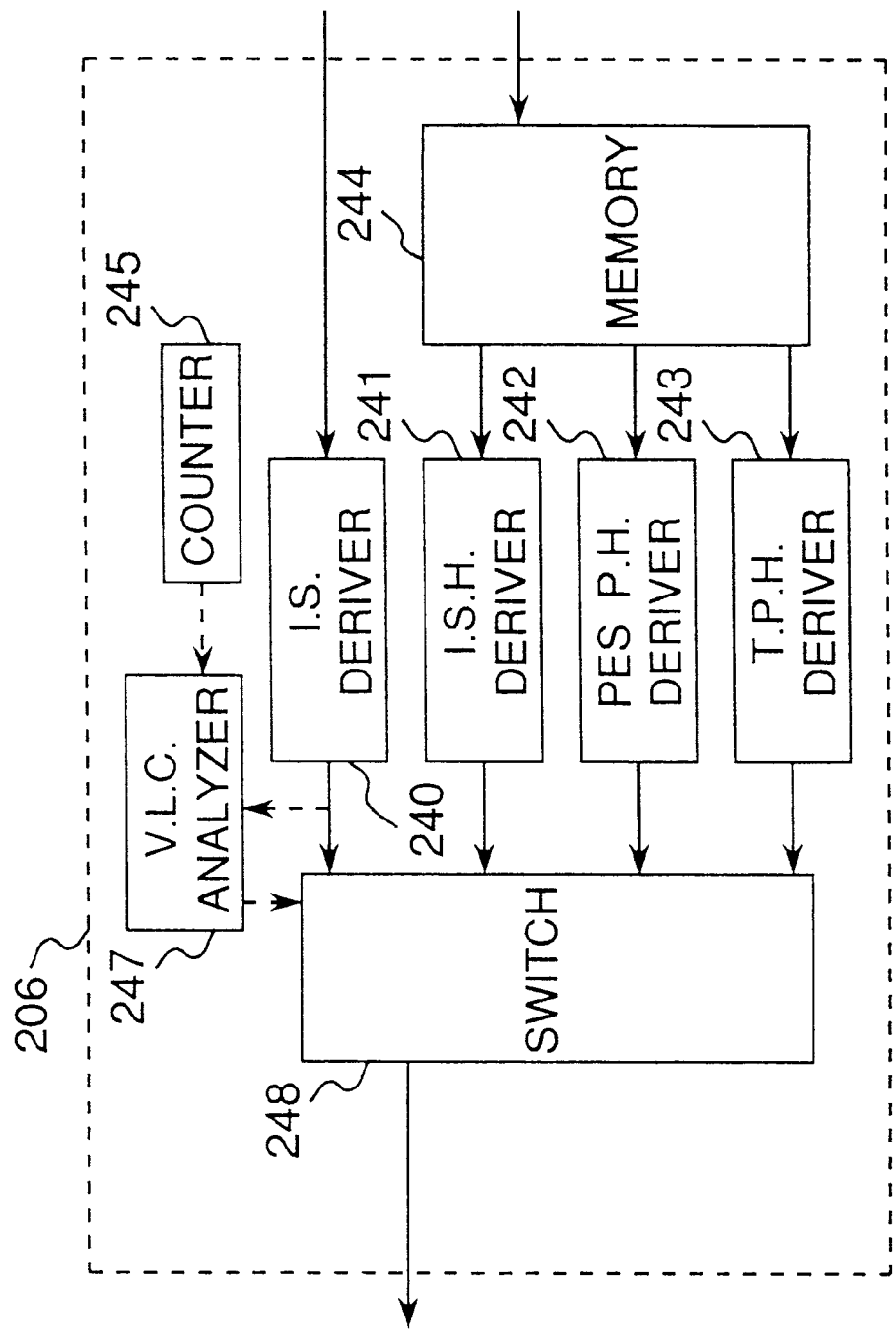
FIG. 2D is a block diagram of a special reproduction signal reconstructor of the second embodiment.

FIG. 2D shows a construction of the special reproduction signal (SRS) reconstructor 206 which comprises a special reproduction image data (IS) deriver 240, image signal header (ISH) deriver 241, PES packet header (PES PH) deriver 242, transmission packet header (TPH) deriver 243, memory 244, counter 245, variable length code (VLC) analyzer 247 and switching unit 248.

In the special reproduction mode, when the data signal identified by the deformatter 15 is a sync block composed of the system data, the header data contained in the PES packet, the header data contained in the transmission packet and the header data of the image signal are stored respectively at predetermined positions in the memory 244.

When the identified signal is a recording packet composed of special reproduction image data, the special reproduction data is sequentially analyzed and generated in the SRS reconstructor 206.

In the variable length code analyzer 247, the bit stream is sequentially analyzed, and when reaching a position such as a frame division, slice division and the like to which the system data is to be inserted, the corresponding system data stored in the memory is generated at every division position. When reaching a dividing position such as division of 188 bytes to which the transmission packet header and PES packet header are to be inserted, the corresponding packet header is supplied from the memory at every division. When the recording position and order of the system data are appropriately generated and arranged suitably to the special reproduction data in the recording mode, the system data can be merely generated in the order of the reproduction order for inserting the system data to the division.

As described above, in the SRS reconstructor 206, the special reproduction data is added with system data, fixed length of packet, value of quantization table obtained from the system data by means of the VLC decoder 247. The special reproduction data is also added with packet data necessary for generating the special reproduction data in a packet format, with use of the transmission packet header data generated by the transmission packet header deriver 241 and PES packet header data generated by the PES packet header deriver 242, whereby the special reproduction transmission packet of 188 bytes is formed to generate a special reproduction signal.

In more detail, the video sequence data for special reproduction is generated using the headers of the sequence, GOP and picture of each block, and thereafter the resultant data is provided with the PES packet header added thereto to form a PES packet, which the PES packet is provided with the transmission packet header added thereto to form a transmission packet.

As described above, in this embodiment, by recording the auxiliary signal and data necessary for generating the decoding signal other than the signal for normal reproduction when the special reproduction signal is generated, the decoding of the special reproduction signal can be easily effected similarly to the operation in the normal reproduction mode.

Moreover, by recording the packet header data necessary for forming a packet and also recording the system data necessary when reconstructing and decoding the data, packeting of the data can be easily effected when generating the data.

Thus, the special reproduction signal can be generated with the data format and image format both in common to those in the normal reproduction mode, whereby high quality of image picture can be obtained in the special reproduction mode.

In addition, since the system data can be referred to also in the normal reproduction mode, when an error occurs, the error can be corrected with reference to the system data.

Although additive data is added to each sync block, any type of the additive data may be added.

Moreover, although the sync block header is recorded with a flag indicating the special reproduction sync block, the flag may be changed in accordance with the type of the special reproduction data. For example, a sync block recording the DC value and another sync block recording the AC value of the special reproduction data may be distinctly formed, and a flag identifying the two types of sync blocks may be used.

Furthermore, in the switching unit 248, although the transmission packet header data and the PES packet header data are both added as the packet header data, only the PES packet header data may be added in some case of the output data format.

SECOND EXAMPLE OF AUXILIARY SIGNAL GENERATOR

Figure 5A:
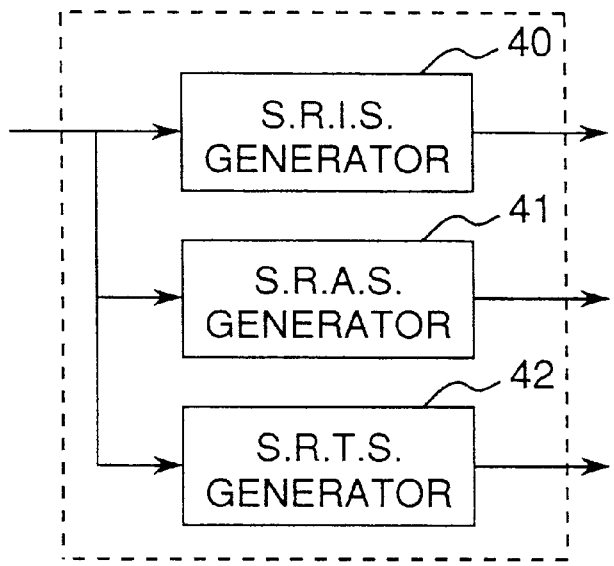
FIGS. 5A and 5B are views for explaining the second way of auxiliary signal generation of the second embodiment.

FIG. 5A shows a second example of the construction of the auxiliary signal generator 200 which comprises a special reproduction image signal (SRIS) generator 40, special reproduction audio signal (SRAS) generator 41, and special reproduction text signal (SRTS) generator 42.

The input signal applied to the auxiliary signal generator 200 is applied to the SRIS generator 40, SRAS generator 41 and SRTS generator 42, respectively.

The special reproduction image signal generator 40 has the same construction as that of the first example of the auxiliary signal generator, where the process is effected for generating a special reproduction image without mixture, omission and erroneous decoding thereof in the special reproduction mode. For example, intra-frame coded signal is extracted and the low frequency component thereof is further extracted. Thus, data amount can be reduced and there can be obtained an image of which the content of the data can be confirmed while with a low resolution.

In the special reproduction audio signal generator 41, a special reproduction audio signal is generated for generating an audio data in the special reproduction mode. For example, audio data portions of the audio signal contained in the input signals are serially connected to be generated except for non-audio portions in order to receive the content in auditory. Alternatively, the audio portions are generated at intervals of audio frame of 26.12 milli sec. only in a predetermined period. Otherwise, an audio signal is newly generated in the apparatus to be outputted.

In the special reproduction text signal generator 42, a special reproduction text signal is produced for generating text data such as characters and symbols in the special reproduction mode. For example, numerals and characters are generated for displaying a count value or title when in searching operation.

The resultant special reproduction image data, audio signal and text signal generated by the auxiliary signal generator are fed to the recording packet converter 5 where the data are converted to the sync block format. In this stage, an identifying flag is added to each of the normal reproduction signal, special reproduction image signal, special reproduction audio signal, and special reproduction text signal, for distinctly identifying therebetween.

In the signal reconstructor, the data signals are recovered in a sync block unit and distinctly separated into normal reproduction signal, special reproduction image signal, and special reproduction audio signal, based on the identifying signal.

Figure 5B:
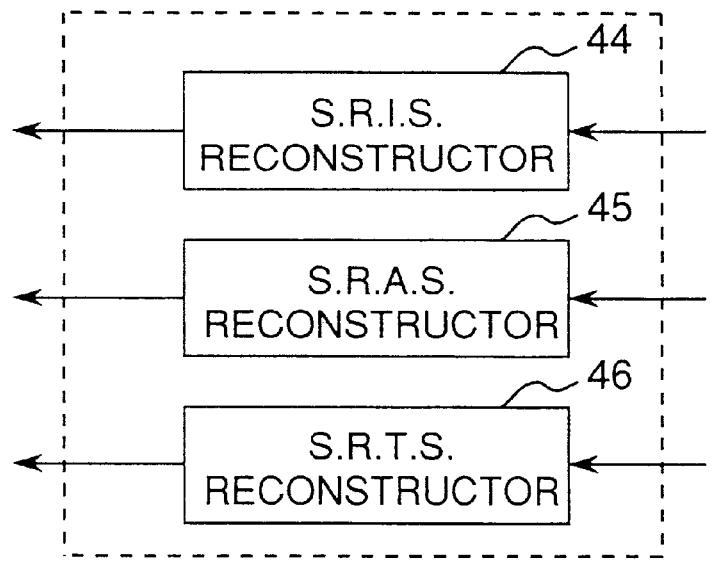

In the special reproduction signal reconstructor as shown in FIG. 5B which comprises a special reproduction image signal reconstructor 44, special reproduction audio signal reconstructor 45 and special reproduction text signal reconstructor 46, the special reproduction image signal, special reproduction audio signal and special reproduction text signal are respectively fed to the special reproduction image signal reconstructor 44, special reproduction audio signal reconstructor 45 and special reproduction text signal reconstructor 46.

The operation of the signal reconstructor for the normal reproduction mode and the operation of the special reproduction image signal reconstructor 44 for the special reproduction mode are similar to those of the first embodiment, and the redundant explanation thereof is omitted here.

In the special reproduction audio signal reconstructor 45, the process effected in the special reproduction audio signal generator 41 is reversely recovered and the audio data is converted to a signal format decodable in a MPEG decoder (not shown).

In the special reproduction text signal reconstructor 46, the process effected in the special reproduction text signal generator 42 is reversely recovered and the text data is converted to a signal format decodable is in a MPEG decoder.

By this arrangement, the contents of the data recorded on the tape can be confirmed both by visual and auditory senses, allowing to rapidly feed the magnetic tape to a desired position by a fast feeding of the tape.

THIRD EXAMPLE OF AUXILIARY SIGNAL GENERATOR

Figure 5C:
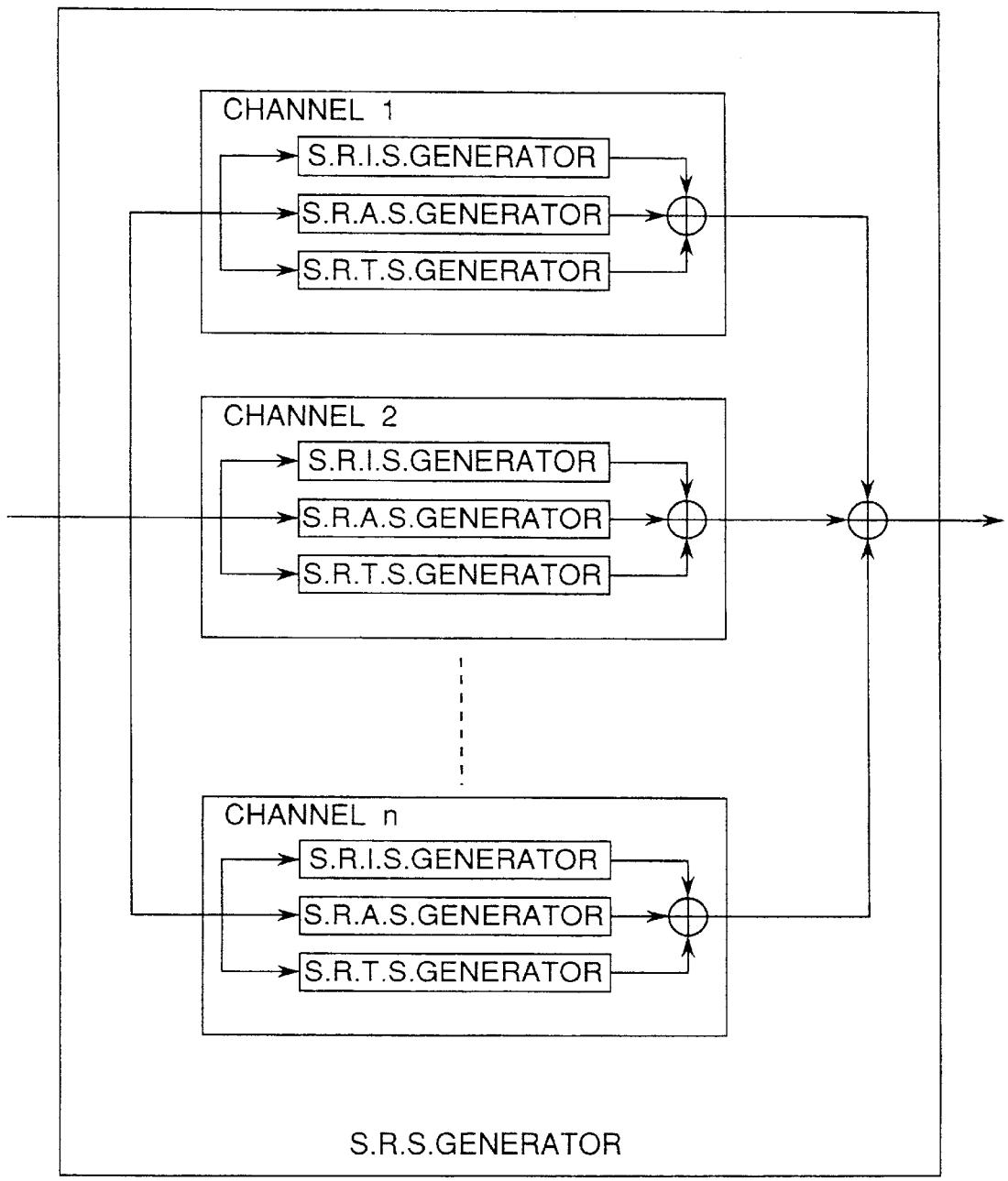
FIG. 5C is a view for explaining the third way of auxiliary signal generation of the second embodiment.

FIG. 5C shows a construction of a special reproduction signal generator for explaining a third example of a way of the auxiliary signal generation and signal reconstruction in the case where compressed television signals of multiplexed programs of a plurality of channels are recorded and reproduced.

In the special reproduction signal generator of this example, there is produced a special reproduction signal capable of generating a partial or entire image data and audio data of each channel and text data such as character or symbol data in the special reproduction mode.

In FIG. 5C, the construction corresponds to n channels of multiplexed signals, where each channel comprises a special reproduction image signal generator for generating a special reproduction image signal, special reproduction audio signal generator for generating a special reproduction audio signal, and special reproduction text signal generator for generating a special reproduction text signal.

In the special reproduction signal reconstructor, the special reproduction signal is recovered by effecting process reversely to that in the special reproduction signal generator, thereby to convert the signal to form a signal format decodable in a MPEG decoder.

In the special reproduction mode, a part of entire part of each channel is switched so that the whole special reproduction signals are outputted.

By this arrangement, a part or entire part of the content of the multiplexed channels can be confirmed.

FIRST METHOD OF CLASSIFYING SPECIAL REPRODUCTION DATA

The following describes a first method of classifying the plural types of special reproduction data generated in the manner mentioned above.

In the method of the first embodiment where the data is recorded in a transmission packet format, in a similar manner to the first construction, a flag for identifying between the special reproduction data and the normal reproduction data is added to the header of each sync block, whereby the special reproduction data can be recorded in a similar manner to that of the normal reproduction signal.

In this case, the types of the special reproduction data can be distinctly identified based on the packet ID contained in te transmission packet header, and therefore adding of the identification signal identifying the types of the special reproduction data can be omitted. However, it is necessary to newly form a header of a transmission packet to be added in the recording mode. In this method, the data can be easily converted to a transmission packet format in the special reproduction mode.

SECOND METHOD OF CLASSIFYING SPECIAL REPRODUCTION DATA

In the second embodiment of the method for recording only necessary components of each signal, in the special reproduction mode, a header of a transmission packet is formed to be added to generate the resultant data in a transmission packet format. In this example, since it is not necessary to record the header of the transmission packet, the recording capacity of the memory can be improved. In this case, however, since the transmission packet header is not recorded, it is impossible to distinctly identify between the special reproduction image signal, special reproduction audio signal and special reproduction text signal, based on the resultant data of the transmission packet format per se.

FIG. 5D shows an example of an arrangement of an identification signal identifying between the special reproduction image signal, special reproduction audio signal or special reproduction text signal to be recorded in a sync block on the recording medium, where reference numeral 300 denotes a sync block header, 301 denotes an identification signal, and 302 denotes a special reproduction signal. When the special reproduction signal 302 is a special reproduction image signal, an image signal identifying signal is added to the sync block header to be recorded. When the special reproduction signal 302 is a special reproduction audio signal, an audio signal identifying signal is added to the sync block header, and when the special reproduction signal 302 is a special reproduction text signal, a text signal identifying signal is added to the sync block header to be recorded. Thus, even when each of the signals is recorded at any optional position on the tape tracks, the types of the signal contained in the sync block can be distinctly identified based on the identification signal to thereby reconstruct the signal correctly.

This example of the method is also effective in the case where a plurality of channels are multiplexed. When the signal 302 is a special reproduction signal of channel 1, an identification signal identifying the channel 1 is added to the sync block header to be recorded, and when the signal 302 is a special reproduction signal of channel 2, an identification signal identifying the channel 2 is added to the sync block header to be recorded. Thus, even when signals of each channel is recorded at any optional position on the tape tracks, the types of the channel contained in the sync block can be distinctly identified based on the identification signal in the special reproduction mode to thereby correctly reconstruct the signals.

THIRD METHOD OF CLASSIFYING SPECIAL REPRODUCTION DATA

Figure 5E:
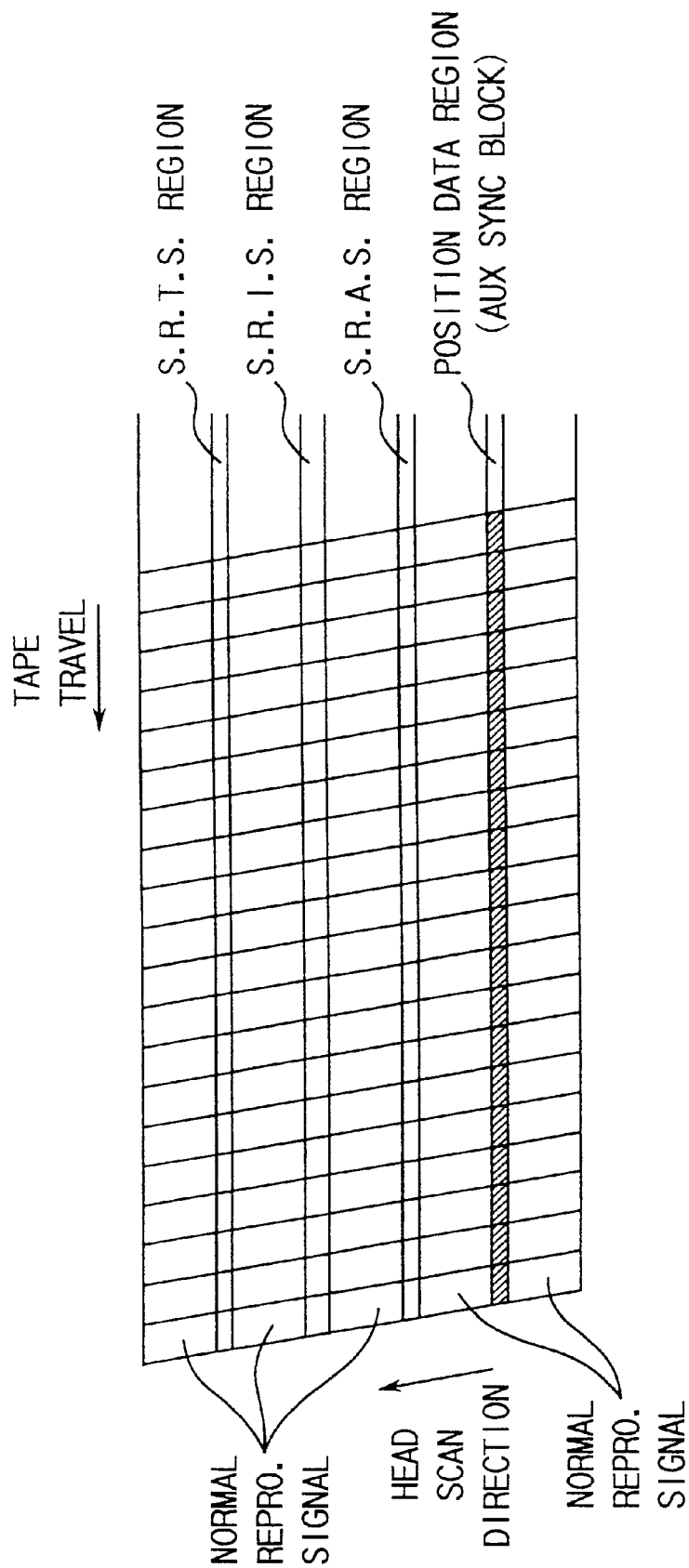
FIG. 5E is a view for explaining the third identification way of an auxiliary signal of the second embodiment.

FIG. 5E shows a positional data recording pattern of recording a positional data relating to the region for recording the special reproduction image signal, special reproduction audio signal or special reproduction text signal, in the AUX sync block on the magnetic tape tracks. Thus, even when each of the signals is located at any optional position on the tape tracks in the recording mode, the recording position of each signal can be confirmed based on the positional data in the special reproduction mode, whereby the signals can be correctly reconstructed.

This method is also effective for identifying a special reproduction signal of each channel.

FIG. 5F shows a recording pattern of each special reproduction signal and each special reproduction system data.

In more detail, each of the special reproduction image signal, special reproduction audio signal and special reproduction text signal are respectively assembled to be recorded, while the special reproduction image system data, special reproduction audio data and special reproduction text data are recorded at positions immediately before the special reproduction image signal, special reproduction audio signal and special reproduction test signal, respectively, for recovering each of the special reproduction signals.

Thus, since there exists system data on each boundary, the same types of the special reproduction data can be easily assembled even when each of the signals is located at any optional position on the tape tracks in the recording mode, whereby the signals can be correctly reconstructed by combining with the system data located immediately before thereof.

This method is also effective for identifying the special reproduction signal of each channel.

In addition, this method is also effective for identifying the frame divisions in the special reproduction signal. Moreover, the auxiliary frames may be reproduced in a unit of one frame by locating the system data at the boundary of data of each auxiliary frame instead of using the method of FIG. 7A.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital signal recording and reproducing apparatus that receives a digital signal as transmission packets in MPEG format, the input digital signal being recorded onto a recording medium as recording packets in a predetermined recording packet format, said apparatus having a recording system and reproducing system, said recording system comprising:

auxiliary signal generating means for generating an auxiliary signal as auxiliary signal transmission packets in the MPEG format, based on the input digital signal;

recording signal conversion means for forming a first group from p transmission packets, dividing the first group into m first synchronous blocks, where p and m are different integers greater than one, and adding a synchronous block header to each of the m synchronous blocks, so as to form m recording packets, the synchronous block header including an identification flag indicating whether the recording packets relates to the transmission packets or the auxiliary signal transmission packets, and forming a second group from the p auxiliary signal transmission packets, dividing the second group into m second synchronous blocks, and adding the synchronous block header to each of the m synchronous blocks, so as to form the m recording packets; and recording means for adding ID information indicating a position in the recording medium to the recording packets formed by said recording signal conversion means, and recording signals of said recording packets with the ID information onto said recording medium; and said reproducing system comprising:

a reproduction signal processing means for reading out a reproduction signal from said recording medium, reconstructing said recording packets from said reproduction signal and rearranging the recording packets in accordance with said ID information in the same order as on the recording medium;

detecting means for detecting said identification flag in said reconstructed recording packets to determine whether said recording packet relates to one of said digital signal and said auxiliary signal; and signal reconstruction means for reconstructing one of said p transmission packets and said p auxiliary signal transmission packets in said MPEG format from the rearranged m reconstructed recording packets in accordance with said identification flag detected by said detecting means, said identification flag selecting between said digital signal and said auxiliary data in said recording packet.

2. The digital signal recording and reproducing apparatus according to claim 1, wherein the auxiliary signal is recorded in a predetermined position on the recording medium.

3. The digital signal recording and reproducing apparatus according to claim 1, wherein said signal reconstruction means reconstructs the auxiliary signal transmission packets using the recording packet comprised of the auxiliary signal in a special reproduction mode.

4. The digital signal recording and reproducing apparatus according to claim 1, wherein said auxiliary signal generating means generates a plurality of different types of auxiliary signals.

5. The digital signal recording and reproducing apparatus according to claim 1, wherein said recording means additionally records onto the recording medium the identification signals for identifying the plural different types of auxiliary information.

6. The digital signal recording and reproducing apparatus according to claim 4, wherein when a compressed television signal is inputted as the digital signal, said auxiliary signal generating means generates the auxiliary signal from the compressed television signal, said generated auxiliary signal comprising at least one of:

a special reproduction image signal for outputting images in the special reproduction mode;

a special reproduction audio signal for outputting audio in the special reproduction mode; and a special reproduction text signal for outputting a text signal containing text and symbol data in the special reproduction mode.

7. The digital signal recording and reproducing apparatus according to claim 6, wherein said recording means additionally records onto the recording medium an identification signal for identifying among said special reproduction image signal, special reproduction audio signal, and special reproduction text signal.

8. The digital signal recording and reproducing apparatus according to claim 4, wherein when said apparatus receives an input signal of a compressed television signal composed of plural channels multiplexed in a predetermined transmission packet format, said auxiliary signal generating means generates respective auxiliary signals for all or part of the plural channels from the compressed television signal, and said signal reconstruction means reconstructs the auxiliary signals for all or part of the plural multiplexed channels of the auxiliary signals generated by said auxiliary signal generating means, from the signal obtained by said reproduction signal processing means.

9. The digital signal recording and reproducing apparatus according to claim 1, wherein when the digital signal contains a compressed image signal, said auxiliary signal generating device generates, as an auxiliary signal, a second image signal, from said input compressed image signal and a frame identification signal for identifying the second image signal in each display frame, and said signal reconstruction means reconstructs the digital signal or auxiliary signal to be outputted using the recording packet relating to said input digital signal or said auxiliary signal, and wherein said signal reconstruction means reconstructs the digital signal based on the frame identification signal when the signal is reconstructed using the recording packet relating to the auxiliary signal, whereby the reconstructed digital signal is outputted based on the frame identification signal to thereby prevent the images of different frames from being mixed.

10. The digital signal recording and reproducing apparatus according to claim 9, wherein said signal reconstruction means resequences each of the auxiliary frame signals in reverse order during a reverse reproduction mode.

11. The digital signal recording and reproducing apparatus according to claim 1, wherein said recording means records the digital signal onto the recording medium in a manner that, each track is composed of q pieces of recording packets formed on the recording medium and the transmission packets does not across plural recording track groups where one group comprises r tracks.

12. The digital signal recording and reproducing apparatus according to claim 1, wherein said recording signal conversion means comprises a format information generating means for generating information relating to a position of divisions in the transmission packets of the digital signal, and said recording means records onto the recording medium the output of said format information generating means and the digital signal.

13. The digital signal recording and reproducing apparatus according to claim 12, wherein said format information generating means generates a division information flag indicating whether or not the information relating to the position of the divisions in the transmission packets of the digital signal is generated, and generates said division information when the division information flag indicates the division information to be generated.

14. The digital signal recording and reproducing apparatus according to claim 1, wherein said apparatus receives a digital signal as its input signal to be transmitted in a predetermined transmission packet format and said apparatus comprises a capture means for capturing information concerning the configuration of the input signal, and said recording means records the output of said capture means onto the recording medium.

15. The digital signal recording and reproducing apparatus according to claim 14, wherein said capture means captures at least one information of: information of the input transmission rate of the input signal; information of the effective data length in the compressed television signal packets, and information of the configuration of the packet header portion.

16. The digital signal recording and reproducing apparatus according to claim 1 further comprising a capture means for capturing all or part of the information relating to the dividing position in each frame of the image signals contained in the input digital signal, wherein said recording means records the output of said capture means at a predetermined position on the recording medium.

17. The digital signal recording and reproducing apparatus according to claim 1, wherein said recording means generates as an added signal packet a signal of a data rate equivalent to the difference between the recording data rate of the recording medium and the output data rate of said recording signal conversion means in the recording packet format, and performs a predetermined recording signal process on the output data of said recording signal conversion means together with a identification signal for identifying whether or not the signal is an added signal packet, to record the processed signals onto the recording medium, and wherein said signal reconstruction means handles the added signal packet as an invalid packet and does not execute the subsequent process, when the reconstructed recording packet is an added-signal packet.

18. The digital signal recording and reproducing apparatus according to claim 17 further comprising:

a detection means for detecting at least part of dividing positions between frames of the image signals contained in the digital signal; and an additive signal setting means for setting the location and size of the additive signals so that the frame dividing positions are disposed at a predetermined position on the recording medium, wherein said recording means records the additive signal and compressed television signal to the recording medium.

19. The digital signal recording and reproducing apparatus according to claim 1 comprising:

a timing reference signal detecting means for detecting, in the auxiliary signal transmission packet, the presence and position of a timing reference signal which is referenced by the apparatus receiving the transmission packet to synchronize the operating clock, decoding timing, or display timing; and a timing reference signal rewriting means for rewriting at reproducing the timing reference signal in the auxiliary signal transmission packet detected by said timing reference signal detecting means so as to be correctly synchronized with the current special reproduction speed.

20. The digital signal recording and reproducing apparatus according to claim 1, further comprising:

a timing reference signal detecting means for detecting in the auxiliary signal transmission packet the presence and position of a timing reference signal;

a timing reference signal deleting means for removing the timing reference signal in the auxiliary signal transmission packet detected by said timing reference signal detecting means; and a timing reference signal adding means for generating and adding a timing reference signal to the reconstructed auxiliary signal transmission packet in a special reproduction mode to be correctly synchronized with the current special reproduction speed.

21. The digital signal recording and reproducing apparatus according to claim 1 further comprising:

a timing reference signal detecting means for detecting the presence and position of a timing reference signal in the auxiliary signal transmission packet; and a timing reference signal rewriting means for rewriting the timing reference signal at recording in the auxiliary signal transmission packet detected by said timing reference signal detecting means.

22. The digital signal recording and reproducing apparatus according to claim 21, wherein said auxiliary signal generating means generates separate auxiliary signals individually corresponding to each of the specific plural special reproduction speeds, and said timing reference signal overwriting means rewrites the timing reference signal of each of the auxiliary signals to be correctly synchronized with each of the special reproduction speeds, and said signal reconstruction means reconstructs the auxiliary signal according to any of the plural special reproduction speeds.

23. The digital signal recording and reproducing apparatus according to claim 1 further comprising a timing reference packet generating means for generating a transmission packet containing a timing reference signal to be correctly synchronized during the period in which the reproduction signal is not read out of the recording medium when the reproduction speed is changed.

24. A digital signal recording and reproducing apparatus that receives a digital signal transmitted as transmission packets in MPEG transmission packet format, the digital signal containing a compressed image signal and being recorded onto a recording medium as recording packets in a predetermined recording packet format, said apparatus having a recording system and reproducing system, said recording system comprising:

auxiliary frame signal generating means for generating an auxiliary frame signal as the recording packets transmission packets, the recording packets including a synchronous block header having an identification flag indicating whether the recording packets relate to the input digital signal, the auxiliary frame signal or a common header signal, the auxiliary frame signal being used to generate an image signal in a specific reproduction mode;

common header signal generating means for generating the common header signal as the recording packets from the transmission packets, the recording packets including the synchronous block header having the identification flag, the common header including a common required signal for decoding one of each auxiliary frame signal and a signal required for converting the recording packets of the auxiliary frame signal to the MPEG transmission packet format;

recording signal processing means for forming a group from p transmission packets dividing the group into m synchronous blocks, where p and m are different integers greater than one, and adding the synchronous block header including the identification flag to each of the m synchronous blocks, so as to form m recording packets; and recording means for adding ID information indicating a position in the recording medium to the recording packets of the digital signal, the recording packets of the auxiliary frame signal and the recording packets of the common header signal in accordance with the identification flag, to record the recording packets onto the recording medium, said reproducing system comprising:

reproduction signal processing means for reading out a reproduction signal from said recording medium, reconstructing the recording packets including the identification flag from said reproduction signal, and rearranging the recording packets in accordance with the ID information in the same order as on the recording medium; and signal reconstruction means for reconstructing the p transmission packets of the digital signal in the MPEG transmission packet format from the rearranged m recording packets of the digital signal identified by the identification flag in a normal reproduction mode, and reconstructing signals having the MPEG transmission packet format from the rearranged recording packets of the auxiliary frame signal and the rearranged recording packets of the common header signal in a special reproduction mode, the recording packets of the auxiliary frame signal and the recording packets of the common header signal are identified by the identification flag in each of the recording packets.

25. The digital signal recording and reproducing apparatus according to claim 24, wherein said auxiliary frame signal is all or a part of the image signal for intra-frame coded frames among the image signals compressed by inter-frame predictive coding.

26. The digital signal recording and reproducing apparatus according to claim 24, wherein said recording signal processing means locates the common header signal at the dividing positions of each of the auxiliary frame signals, and said signal reconstruction means reconstructs the auxiliary frame signals with the common header signal reproduced immediately before the current frame signal during the special reproduction mode.

27. The digital signal recording and reproducing apparatus according to claim 24, wherein said apparatus receives the digital signal to be transmitted as the transmission packets in MPEG transmission format, and said apparatus comprises a capture means for capturing information concerning the configuration of the input digital signal, and said recording means records the output of said capture means onto the recording medium.

28. The digital signal recording and reproducing apparatus according to claim 27, wherein said capture means captures at least one information of: information of an input transmission rate of the input digital signal; information: of an effective data length in compressed television signal packets, and information of a configuration of a packet header portion.

29. The digital signal recording and reproducing apparatus according to claim 24, wherein said recording means records the digital signal onto the recording medium in a manner that, each track is composed of q pieces of recording packets formed on the recording medium and the transmission packets does not across plural recording track groups where one group comprises r tracks.

30. The digital signal recording and reproducing apparatus according to claim 24, wherein said recording means generates as an added signal packet a signal of a data rate equivalent to the difference between the recording data rate of the recording medium and the output data rate of said recording signal conversion means, and performs a predetermined recording signal process on the output data of said recording signal conversion means together with the identification signal for identifying whether or not the signal is an added signal packet, to record the processed signals onto the recording medium, and wherein said signal reconstruction means handles the added signal packet as an invalid packet and does not execute the subsequent process, when the reconstructed recording packet is an added-signal packet.

31. The digital signal recording and reproducing apparatus according to claim 30 further comprising:

a detection means for detecting all or part of the dividing positions between the frames of the image signals contained in the input digital signal; and an additive signal setting means for setting the location and size of the additive signals so that the frame dividing positions are disposed at a predetermined position on the recording medium, wherein said recording means records the additive signal and a compressed television signal to the recording medium.

32. A digital signal recording and reproducing apparatus having a recording system that records a digital input signal transmitted as transmission packets in MPEG format onto a recording medium as recording packets, and a reproduction system that reads the recording packets from the recording medium and reproduces a recorded signal as transmission packets;

said recording system comprising:

an auxiliary signal generation judging device that determines whether an auxiliary signal is generated in accordance with the digital input signal as the transmission packets;

an auxiliary signal generating device that generates an auxiliary signal as auxiliary signal transmission packets in the MPEG format based on the digital input signal, the auxiliary signal generating device generating auxiliary signal generation indicating data that indicates generation of the auxiliary signal when the auxiliary signal generation judging device determines an auxiliary signal is generated, and alternatively generates auxiliary signal non-generation indicating data that indicates no generation of an auxiliary signal when the auxiliary signal generating device determines an auxiliary signal is not to be generated;

a recording signal conversion device that forms a first group from p transmission packets, divides the first group into m first synchronous blocks, where p and m are different integers greater than one, and adds a synchronous block header to each of the m synchronous blocks, so as to form m recording packets the synchronous block header including an identification flag indicating whether the recording packets relates to the transmission packets or the auxiliary signal transmission packets, the recording signal conversion device further forming a second group from the p auxiliary signal transmission packets, dividing the second group into m second synchronous blocks, and adding the synchronous block header to each of the m pieces of the synchronous blocks, so as to form the m pieces of the recording packets; and a recording device that subjects the auxiliary signal generation and non-generation data and the recording packets to a specific recording signal process, adds ID information indicating a position in the recording medium to each of the recording packets, and records recording signals of the auxiliary signal generation and non-generation data and the recording packets with ID information to said recording medium, and said reproducing system comprising:

a reproduction signal processing device that reads out a reproduction signal from said recording medium and performs a specific reproduction process on said reproduction signal, to reconstruct said recording packets and said auxiliary signal generation and non-generation data, and rearranges the recording packets in accordance with the ID information in the same order as on the recording medium; and a signal reconstruction device that reconstructs the p auxiliary signal transmission packets to be outputted using the rearranged m recording packets of the auxiliary signal in accordance with the identification flag when the reconstructed auxiliary signal generation data indicates generation of said auxiliary data, and reconstructs the p pieces of the transmission packets of the digital signal to be outputted using the rearranged m recording packets of the digital signal in accordance with the identification flag and displays a message indicating no auxiliary signal when the reconstructed auxiliary signal non-generation data is generated to indicate no generation of said auxiliary data, wherein an identification flag signal is employed to select between the recording packets of the digital signal and the auxiliary data.

33. The digital signal recording and reproducing apparatus according to claim 32, wherein said auxiliary signal generating device generates the auxiliary information generation data comprised of plural types of auxiliary information.

34. The digital signal recording and reproducing apparatus according to claim 32, said recording device records the auxiliary signal at a predetermined location on the recording medium.

35. The digital signal recording and reproducing apparatus according to claim 32, further comprising:

a decrypting evaluation signal detection device that detects a decrypting evaluation signal in the input digital signal for determining whether the input signal can be decrypted;

a non-decryptable information adding device that adds non-decryptable information to the auxiliary signal when said decrypting evaluation signal detection device determines that the input signal cannot be decrypted; and an output prevention device that prevents reconstruction and output of the auxiliary signal when the non-decryptable information is added to the auxiliary signal.

* * * * *

UNITED STATES PATENT AND TRADEMARK OFFICE
CERTIFICATE OF CORRECTION

PATENT NO. : 6,115,537  
DATED : September 5, 2000  
INVENTOR(S) : M. Yamada et al.

Page 1 of 1

It is certified that error appears in the above-identified patent and that said Letters Patent is hereby corrected as shown below:

Title page, Item [57], ABSTRACT,  
Line 24, "reproductions" should be -- reproduction --.

Column 31,  
Line 66 of the printed patent, after "signal" (first occurrence) delete ",".

Column 33,  
Line 12 of the printed patent, after "of" delete "the".

Column 34,  
Line 17 of the printed patent, after "packets" insert -- from the --.

Column 35,  
Line 27 of the printed patent, after "information" delete ":".

Column 36,  
Line 27 of the printed patent, after "packets" insert -- , --.

Signed and Sealed this

Twenty-fifth Day of December, 2001

Attest:

*Attesting Officer*

JAMES E. ROGAN  
*Director of the United States Patent and Trademark Office*